United States Patent
Mitsumoto

(10) Patent No.: US 10,776,974 B2
(45) Date of Patent: Sep. 15, 2020

(54) INFORMATION PROCESSING APPARATUS AND CONTROL METHOD OF INFORMATION PROCESSING APPARATUS

(71) Applicant: CANON KABUSHIKI KAISHA, Tokyo (JP)

(72) Inventor: Shinichi Mitsumoto, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/021,311

(22) Filed: Jun. 28, 2018

(65) Prior Publication Data
US 2019/0005697 A1 Jan. 3, 2019

(30) Foreign Application Priority Data
Jul. 3, 2017 (JP) .................................. 2017-130426

(51) Int. Cl.
*G06T 11/60* (2006.01)
*G06K 9/00* (2006.01)
*H04L 29/08* (2006.01)

(52) U.S. Cl.
CPC .......... *G06T 11/60* (2013.01); *G06K 9/00288* (2013.01); *G06K 9/00677* (2013.01); *H04L 67/36* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,235,760 B2 | 1/2016 | Yamaji et al. | |
| 2011/0064319 A1* | 3/2011 | Momosaki | G11B 27/34 382/224 |
| 2014/0281965 A1* | 9/2014 | Yamaji | G06F 3/04817 715/708 |
| 2015/0261994 A1* | 9/2015 | Yamaji | G06K 9/00288 382/118 |
| 2016/0371815 A1* | 12/2016 | Patankar | G06T 3/4007 |
| 2017/0039453 A1 | 2/2017 | Mitsumoto et al. | |

FOREIGN PATENT DOCUMENTS

JP 2006-236267 A 9/2006
JP 2014-075778 A 4/2014

* cited by examiner

*Primary Examiner* — Tapas Mazumder
(74) *Attorney, Agent, or Firm* — Venable LLP

(57) ABSTRACT

An information processing apparatus includes an acquisition unit to acquire layout data in which images are arranged on each page of a photo book from an image group, a division unit to divide the image group into subsets based on a number of pages of the photo book, and an image exchange unit to exchange an image arranged within the layout data. The image exchange unit exchanges a first image arranged within a page corresponding to a first subset and in which the first person is included, with a second image in which a second person, different from the first is included, when the second image is included within the first subset, and exchanges the first image with a third when no person is included, when the second image is not included within the first subset but the third image is included.

33 Claims, 19 Drawing Sheets

301

| Image ID | File name | Date and time of image capturing | Face information list (ID,X,Y,W,H) | Score |
|---|---|---|---|---|
| 1 | IMG_0005.jpg | 2016/5/1 13:32:45 | - | 0.532 |
| 2 | IMG_0006.jpg | 2016/5/1 13:35:11 | - | 0.856 |
| 3 | IMG_0008.jpg | 2016/5/1 13:37:28 | [F_001,0.34,0.35,0.05,0.09] | 0.372 |
| 4 | IMG_0009.jpg | 2016/5/1 13:38:45 | [F_001,0.56,0.46,0.2,0.4] | 0.532 |
| 5 | IMG_0011.jpg | 2016/5/1 13:42:11 | - | 0.346 |
| ... | ... | ... | ... | ... |
| 11 | IMG_0019.jpg | 2016/5/1 13:55:51 | [F_001,0.56,0.46,0.19,0.39] | 0.626 |
| 12 | IMG_0021.jpg | 2016/5/1 13:59:23 | [F_001,0.52,0.48,0.21,0.42] | 0.713 |
| 13 | IMG_0024.jpg | 2016/5/1 14:03:37 | - | 0.429 |
| ... | ... | ... | ... | ... |
| 16 | IMG_0028.jpg | 2016/5/1 14:06:32 | - | 0.574 |
| 17 | IMG_0029.jpg | 2016/5/1 14:07:32 | - | 0.582 |
| 18 | IMG_0030.jpg | 2016/5/1 14:08:45 | - | 0.535 |
| 19 | IMG_0031.jpg | 2016/5/1 14:09:11 | - | 0.626 |
| 20 | IMG_0032.jpg | 2016/5/1 14:14:58 | - | 0.582 |
| 21 | IMG_0035.jpg | 2016/5/1 14:15:32 | - | 0.582 |
| 22 | IMG_0037.jpg | 2016/5/1 14:16:32 | [F_001,0.52,0.47,0.25,0.49] | 0.738 |
| 23 | IMG_0038.jpg | 2016/5/1 14:18:32 | [F_001,0.48,0.48,0.21,0.42] | 0.723 |
| ... | ... | ... | ... | ... |
| 142 | IMG_0179.jpg | 2016/5/1 15:05:27 | - | 0.697 |
| 143 | IMG_0181.jpg | 2016/5/1 15:07:30 | [F_002,0.28,0.35,0.08,0.22] [F_003,0.49,0.34,0.09,0.23] [F_004,0.61,0.36,0.08,0.21] | 0.713 |
| 144 | IMG_0182.jpg | 2016/5/1 15:08:09 | [F_002,0.49,0.47,0.23,0.43] | 0.809 |
| ... | ... | ... | ... | ... |

| Page ID | Constituent image ID list |
|---|---|
| 1 | 2,5,12,17 |
| 2 | 22,27,32,37 |
| ... | ... |
| 8 | 144,148,152,155 |

| Subset ID | Start | End |
|---|---|---|
| 1 | 1 | 19 |
| 2 | 20 | 41 |
| ... | ... | ... |
| 8 | 138 | 159 |

FIG.5

| Page ID | Slot ID 1 | | Slot ID 2 | | Slot ID 3 | | Slot ID 4 | |
|---|---|---|---|---|---|---|---|---|
| | Image ID | Coordinates (lx,ly,lw,lh) | Image ID | Coordinates (lx,ly,lw,lh) | Image ID | Coordinates (lx,ly,lw,lh) | Image ID | Coordinates (lx,ly,lw,lh) |
| 1 | 2 | (0.25,0.25, 0.4,0.4) | 6 | (0.25,0.75, 0.4,0.4) | 12 | (0.75,0.5, 0.4,0.8) | N/A | N/A |
| 2 | 22 | (0.25,0.5, 0.4,0.8) | 27 | (0.75,0.25, 0.4,0.4) | 37 | (0.75,0.75, 0.4,0.4) | N/A | N/A |
| ... | ... | ... | ... | ... | ... | ... | ... | ... |
| 8 | 144 | (0.25,0.25, 0.4,0.4) | 148 | (0.25,0.75, 0.4,0.4) | 152 | (0.75,0.25, 0.4,0.4) | 155 | (0.75,0.75, 0.4,0.4) |

INFORMATION PROCESSING APPARATUS AND CONTROL METHOD OF INFORMATION PROCESSING APPARATUS

BACKGROUND OF THE INVENTION

This application claims the benefit of Japanese Patent Application No. 2017-130426, filed Jul. 3, 2017, which is hereby incorporated by reference wherein in its entirety.

FIELD OF THE INVENTION

The present invention relates to an information processing apparatus that assists in creating a photo book and a control method of controlling an information processing apparatus.

DESCRIPTION OF THE RELATED ART

In recent years, a service to create a photo book (hereafter, also referred to as an album) by selecting images from images obtained by performing image capturing by a digital camera or a smartphone has prevailed. Further, the price of the service such as this is falling. Because of this, it is supposed to create a photo book for a participant in an event in which a plurality of persons participates, such as a group tour, and to present the photo book to the participant. In such a case, it is desired to distribute an individual photo book created by taking a recipient as a main character rather than to distribute a photo book with the same contents to all the participants. As a method of enhancing a specific person as a main character, there is a method in which a viewer specifies a person of interest and images including the person are preferentially arranged in an album (see Japanese Patent Laid-Open No. 2006-236267).

According to the method described in Japanese Patent Laid-Open No. 2006-236267, it is possible to provide an album that enhances the specified person to the viewer. However, in a case when an album whose main character is a person different from the specified person is provided separately, it is necessary to create an album from the beginning each time, and, therefore, it takes time and effort.

An object of the present invention is to provide an information processing apparatus capable of easily creating layout data whose main character is another person from layout data of an already-created photo book, and the like.

SUMMARY OF THE INVENTION

The information processing apparatus according to the present invention includes an acquisition unit configured to acquire layout data in which a predetermined number of images is arranged from an image group, a division unit configured to divide the image group into a plurality of subsets, and an image exchange unit configured to exchange an image in which a first person is included of the images arranged within the layout data, and the image exchange unit exchanges, in a case when there is an image that is included in the image group and in which a second person different from the first person is included within the subset, the image in which the first person is included with the image in which the second person is included, and does not exchange, in a case when there is no image in which the second person is included within the subset, the image in which the first person is included with an image in which the second person is included.

Further features of the present invention will become apparent from the following description of exemplary embodiments with reference to the attached drawings.

BRIEF DESCRIPTION OF THE DRAWINGS

FIG. 3 is a diagram showing an image management table;

FIG. 4 is a diagram showing a photo book management table;

FIG. 5 is a diagram showing a subset table;

FIG. 15 is a diagram showing an example of a photo book management table in a third embodiment;

DESCRIPTION OF THE EMBODIMENTS

In the following, with reference to the attached drawings, the present invention is explained in detail based on preferred embodiments. The configurations shown in the following embodiments are merely exemplary and the present invention is not limited to the configurations shown schematically.

First Embodiment

Figure 1:
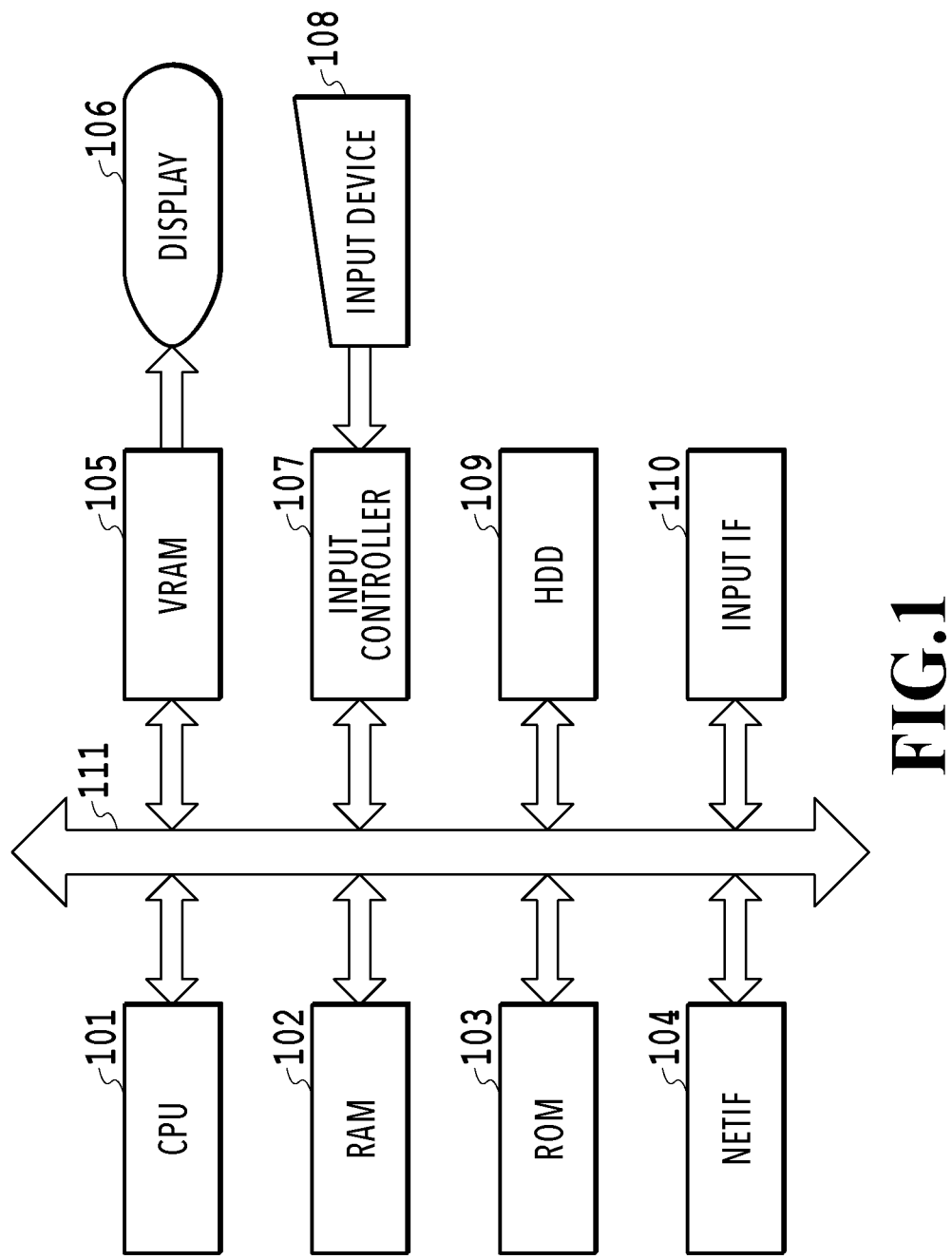
FIG. 1 is a diagram showing a hardware configuration of an information processing apparatus according to a first embodiment.

FIG. 1 is a diagram showing a hardware configuration of an information processing apparatus (hereafter, also referred to as a photo book creation apparatus) according to a first embodiment. A CPU 101 is a central processing unit in charge of control of the entire information processing apparatus, which is a computer system. Each function and each piece of processing in the information processing apparatus, to be described later, are implemented by the CPU 101 performing operations and processing of information and control of each piece of hardware based on control programs. A RAM 102 is a random access memory and functions as a main memory of the CPU 101 and a work memory necessary to load execution programs and for execution of programs. A ROM 103 stores control programs that specify the operation of the CPU 101. The ROM 103 includes a program ROM and a data ROM. In the program ROM, basic software (OS: Operating System), which is a system program performing control of the computer system, is stored. In the data ROM, information necessary for operating the system, and the like, are stored. It may also be possible to use a hard disk drive (HDD) 109 in place of the ROM 103.

A NET IF 104 is a network interface and performs input/output control of data, such as image data, transmitted and received via a network (not shown schematically). Onto a video RAM (VRAM) 105, image data to be displayed on a display 106, which is a display device, is loaded. The display 106 is a display device and, for example, can be a liquid crystal display or a liquid crystal TV. An input controller is a controller that controls an input signal from an input device 108. The input device 108 is an input device that receives operation instructions from a user and, for example, mention is made of a touch panel, a keyboard, a mouse, and a remote controller. The hard disk drive (HDD) 109 stores application programs, image data, and so on.

An input interface (input IF) 110 is an interface for connecting to external devices, such as a CD-ROM drive, a DVD-ROM drive, and a memory card drive. The input IF 110 is used for reading image data acquired by performing image capturing by, for example, a digital camera. An input/output bus 111 is a bus for connecting each component with one another (address bus, data bus, and control bus).

Figure 2:
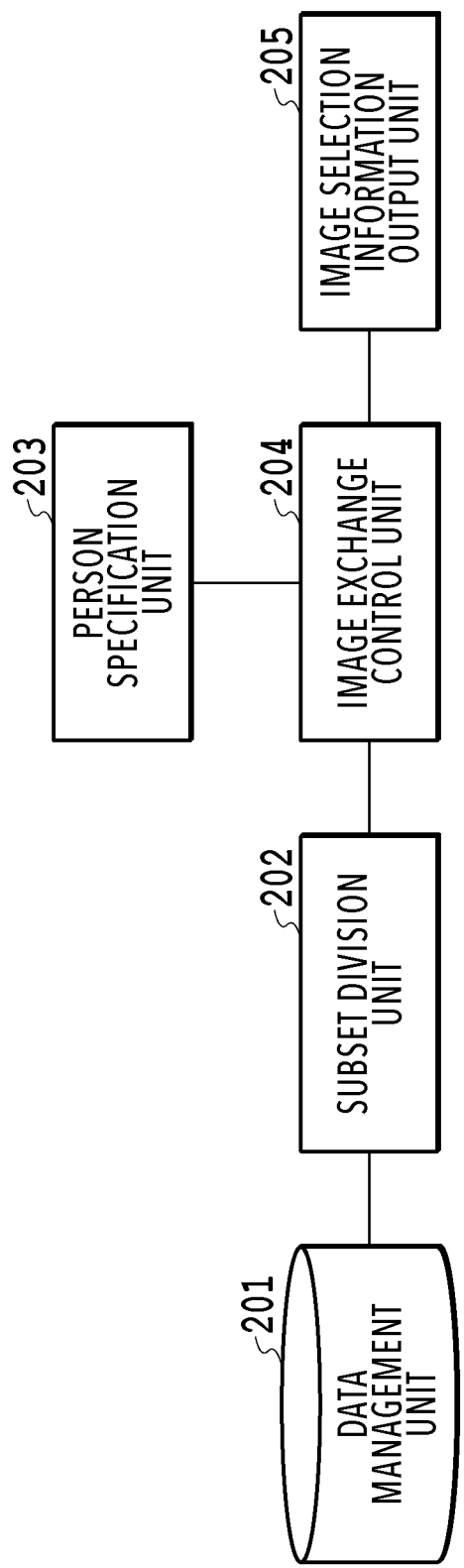
FIG. 2 is a diagram showing an example of a function configuration of the information processing apparatus according to the first embodiment.

FIG. 2 is a diagram showing an example of a function configuration of the information processing apparatus according to the first embodiment. In a photo book, a still image extracted from a moving image and a video data may be used, not only a photo or a still image. Here, the image that is taken to be a target at the time of creating a photo book is called a material image and a set of those images is called a material image set. The material image set is stored in the HDD 109. The material image set is an image group captured in a single event, such as a group tour. A photo book is made up of a predetermined number of images selected from the material image set. In the following, a photo book already created by using the material images is called an already-created photo book. An already-created photo book is layout data in which images are arranged, and, therefore, it is possible to edit the layout data by rewriting a photo book management table, to be described later.

As shown in FIG. 2, the information processing apparatus according to the present embodiment includes a data management unit 201, a subset division unit 202, a person specification unit 203, an image exchange control unit 204, and an image selection information output unit 205. There is a case when the subset division unit 202 and the person specification unit 203 are together expressed as an image exchange unit.

The data management unit 201 manages the material image set stored in the HDD 109 and the images (here, images selected in an already-created photo book) arranged within layout data. The data management unit 201 manages information on those images by using an image management table (hereafter, described as T_img) shown in FIG. 3 and a photo book management table (hereafter, described as T_pb) shown in FIG. 4. Details of those tables will be described later. T_pb is created for each photo book.

The subset division unit 202 divides the material image set into the same number of subsets as the number of opened pages to be a read surface of an already-created photo book as will be described later. The subset division unit 202 manages the subset obtained by dividing the material image set by a subset table (hereafter, described as T_sub) shown in FIG. 5.

The person specification unit 203 specifies a first person who is the main character in the already-created photo book and a second person who is an exchange target by a method, to be described later.

The image exchange control unit 204 exchanges an image in which the first person is captured (image including the first person) of the images selected in the already-created photo book with an image in which the second person is captured (image including the second person) by a method, to be described later.

The image selection information output unit 205 outputs a set of images selected as images in which the second person is captured by the image exchange control unit 204 in the format of T_pb.

An image management table (T_img) 301 shown in FIG. 3 is a table for managing images for each material image set. Consequently, groups of images captured in group tours different from one another are managed by different image management tables, separately. Further, in a case when different visiting destinations are handled as different events in a single tour, groups of images captured at different visiting destinations are managed by different image management tables, separately.

As shown in FIG. 3, T_img 301 includes Image ID, File name, Date and time of image capturing, Face information list, and Score. Here, Image ID is a number that is given in the order of time series of the time of image capturing of an image while being increased one by one. File name is the name of data (file) representing an image. Face information list includes a person ID of a person included in the image and coordinate information on the face area of the person. The coordinate information on the face area includes the X-coordinate, Y-coordinate, width, and height of the face area. In a case when a plurality of persons is included in an image, in Face information list, person IDs corresponding to the number of persons and coordinate information corresponding to the person ID are stored. In the present embodiment, the face area of a person included in an image is detected and by using a face recognition technique and a person ID is given so that the ID is the same for the same person. In the coordinate information, the X-coordinate and the Y-coordinate of the center of the face area of the detected person and a width W and a height H of the face area are stored. To the X-coordinate and the width W, and to the Y-coordinate and the height H, normalized values are given. For normalization, a method is used in which the top left of the image is taken to be the origin and the width of the image and the height of the image are taken to be 1. Score is a value obtained by analyzing an image and evaluating image quality, and a value normalized between 0 and 1 is given. At this time, 0 indicates low image quality and 1 indicates high image quality. In a calculation method of Score, for example, like a method described in Japanese Patent Laid-Open 2014-75778, evaluation is performed by using information obtained by analyzing an image, such as the direction, size, brightness, definition of color, and a degree of blurring and camera shake of the detected face, and Score is determined. Extraction of Date and time of image capturing, generation of Face information list, and calculation of Score are performed, for example, at a timing of each image being saved in the HDD 109.

As shown in FIG. 4, a photo book management table (T_pb) 401 includes Page ID and Constituent image ID list. Page ID is an ID allocated for each double-page spread of the photo book. Constituent image ID list is a list of image IDs of images arranged on each double-page spread. In the present embodiment, the number of images arranged on each double-page spread is set to four. Consequently, in Constituent image ID list of each double-page spread, four image IDs are included. Further, in the present embodiment, it is assumed that the size of each image arranged on a double-page spread is the same. Hereafter, a page refers to a double-page spread unless described particularly. Furthermore, there is a case when the photo book management table is called image selection image or image arrangement information.

Figure 5:
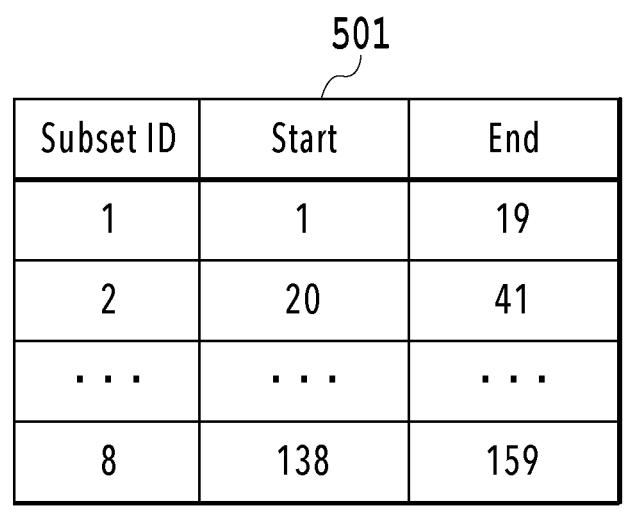

A subset table (T_sub) 501 shown in FIG. 5 includes an ID of a subset (hereafter, described as Subset ID) and the top image ID (hereafter, described as Start) and the last image ID (hereafter, described as End). Subset ID is given in the order from 1 for each subset obtained by dividing the material image set. Subset ID corresponds to a double-page spread of the photo book.

Figure 6:
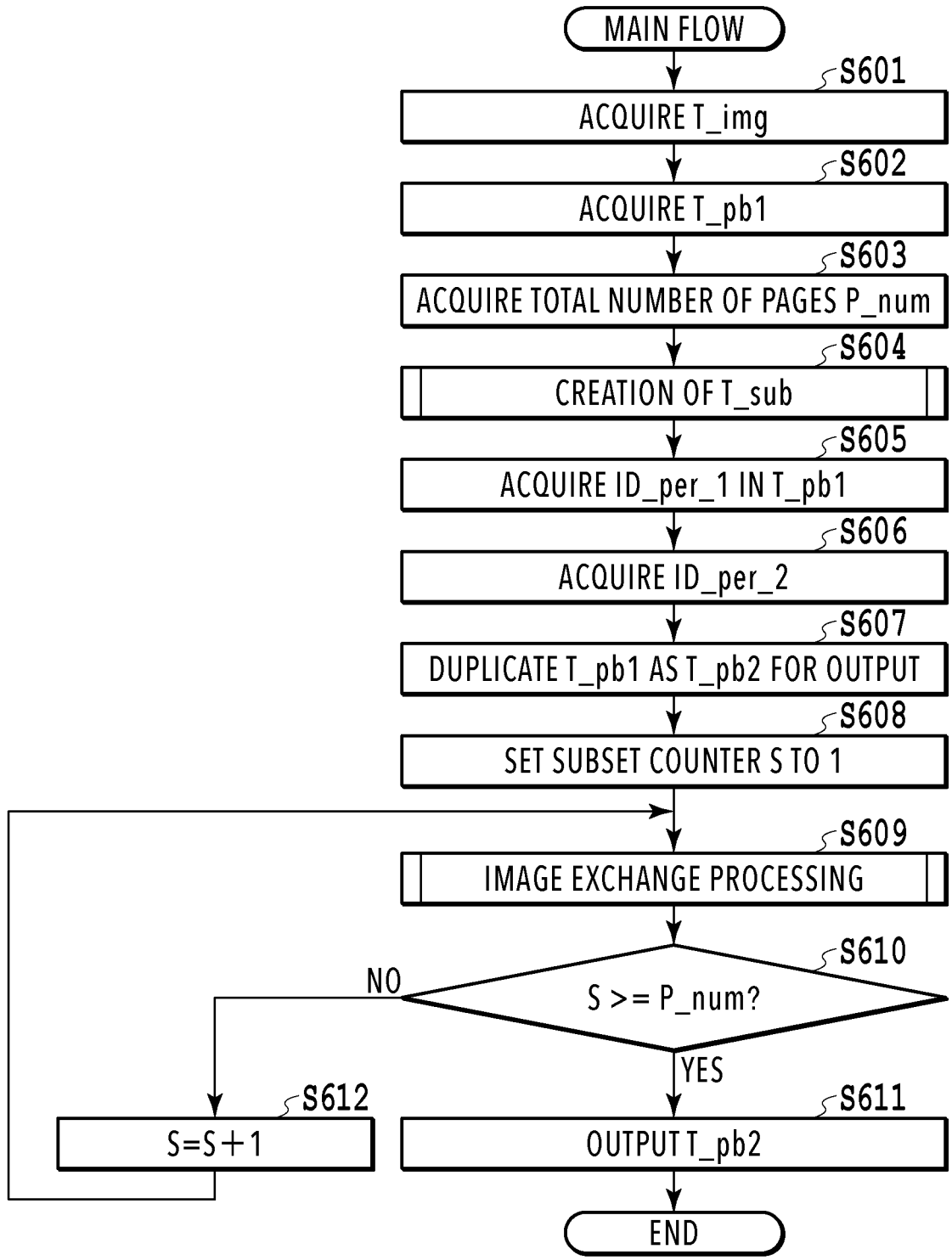
FIG. 6 is a flowchart showing an operation of the information processing apparatus according to the first embodiment.

FIG. 6 is a flowchart showing the operation of the information processing apparatus according to the first embodiment. FIG. 6 shows a main flow of processing to create a photo book management table of a photo book whose main character is the second person by using information on an already-created photo book.

At step S601, the subset division unit 202 acquires T_img as information on the material image set.

At step S602, the subset division unit 202 acquires a photo book management table (hereafter, described as T_pb1) of an already-created photo book.

At step S603, the subset division unit 202 acquires the number of rows of Page ID of T_pb1 acquired at step S602 as a total number of pages (hereafter, described as P_num).

At step S604, the subset division unit 202 divides T_img into subsets based on T_pb1 acquired at step S602 and manages the subsets in the format of T_sub. The processing at step S604 (hereafter, referred to as subset division processing) will be described later by using a flowchart shown in FIG. 8.

Figure 7:
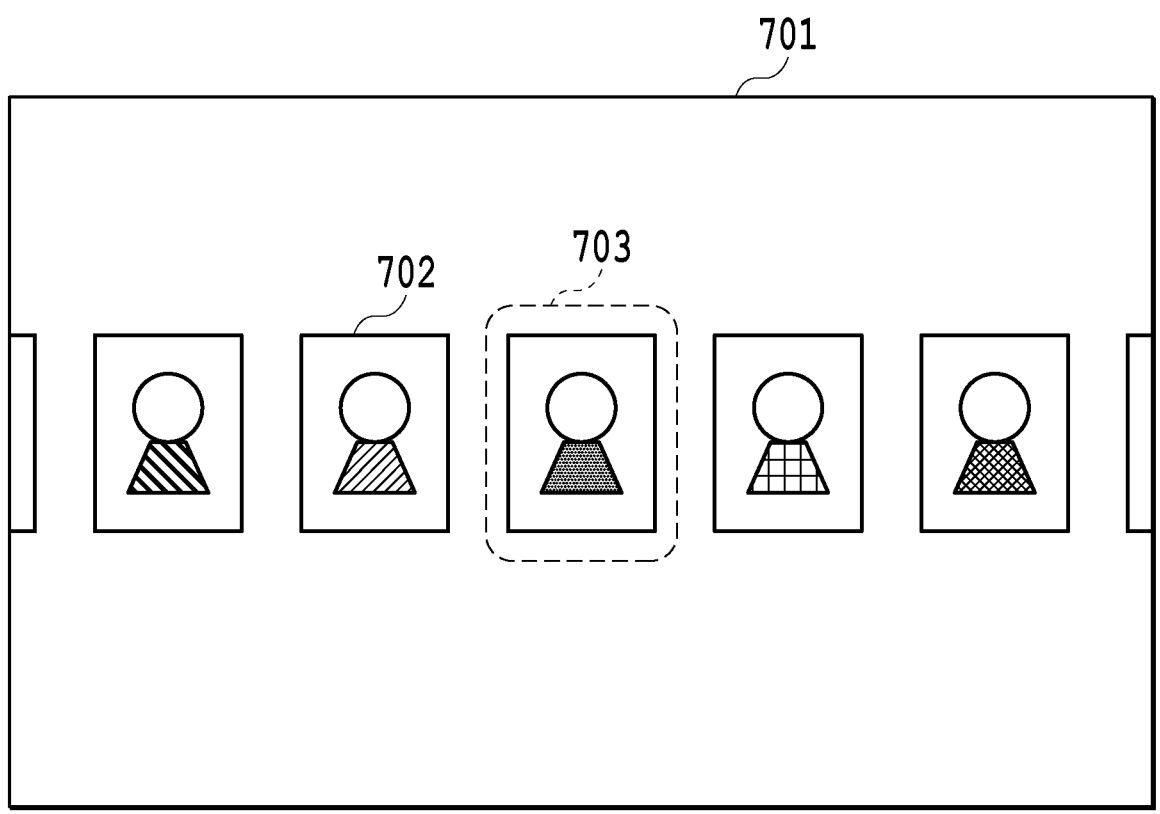
FIG. 7 is a diagram showing an example of a person specification screen.

At step S605, the image exchange control unit 204 acquires the person ID of the first person (hereafter, described as ID_per_1). For example, it may also be possible to acquire the person ID of the person whose number of times of appearance is the largest in the image group included in Constituent image ID list of T_pb1 as ID_per_1. Further, for example, it may also be possible to output a person specification screen 701 that displays a plurality of images 702 including a person on the display 106 and to cause a user (photo book creator) to specify the first person as shown in FIG. 7. Specifically, the image exchange control unit 204 refers to T_img and extracts an image including the person ID from the image corresponding to each image ID included in Constituent image ID list of T_pb1. Then, the image exchange control unit 204 acquires the coordinate information on the person included in the image from T_img for each extracted image and cuts out the face area from the image for each person. Then, the image exchange control unit 204 performs display control for displaying the image of the cut-out face area on the person specification screen 701. Then, in a case when a user selects an image from the images displayed on the person specification screen 701, the person ID of the person corresponding to the selected image is acquired as ID_per_1. A selection frame 703 shown in FIG. 7 indicates that the image enclosed by the selection frame 703 has been selected by the user. In a case when a plurality of images having the same person ID is extracted from T_pb1, it may also be possible to display a representative one on the person specification screen 701.

At step S606, the image exchange control unit 204 acquires the person ID of the second person (hereafter, described as ID_per_2). For the selection of the second person, it may also be possible to use the same method as the selection method of the first person. For example, it may also be possible to acquire the person ID of the person whose number of times of appearance is the second largest in the images corresponding to all the image IDs stored in T_pb1. Further, for example, it may also be possible to display the screen shown in FIG. 7 and to cause a user to perform selection. At this time, different from step S605, the image exchange control unit 204 extracts the image including the person ID from the images corresponding to all the image IDs stored in T_img. Then, the image exchange control unit 204 cuts out the face area for each person from the image for each extracted image and displays the image of the cut-out face area on the person specification screen 701. At this time, the person corresponding to ID_per_1 is excluded from the selection target and not displayed.

At step S607, the image exchange control unit 204 duplicates T_pb1 and creates a table for output for creating a photo book management table whose main character is the second person (hereafter, described as T_pb2).

At step S608, the image exchange control unit 204 initializes a subset counter S indicating the ID of a processing-target subset (Subset ID) to 1. In the following, a subset whose Subset ID is S is described as a subset S.

At step S609, the image exchange control unit 204 performs processing to exchange images (image exchange processing) by using images included in the subset S. Details of the image exchange processing will be described later by using a flowchart shown in FIG. 9.

At step S610, whether the image exchange processing has been completed for all the subsets is determined. In a case when S is greater than or equal to P_num (YES at step S610), the processing advances to step S611. On the other hand, in a case when S is less than P_num (NO at step S610), the processing advances to step S612.

At step S611, the image selection information output unit 205 outputs T_pb2.

At step S612, the image exchange control unit 204 increases the subset counter S by one and takes the next subset as the processing target.

By the above processing, it is possible to generate image selection information (T_pb2) for creating a photo book whose main character is the second person. Further, due to this, it is made possible to create a photo book whose main character is the second person by using the generated image selection information (T_pb2).

Figure 8:
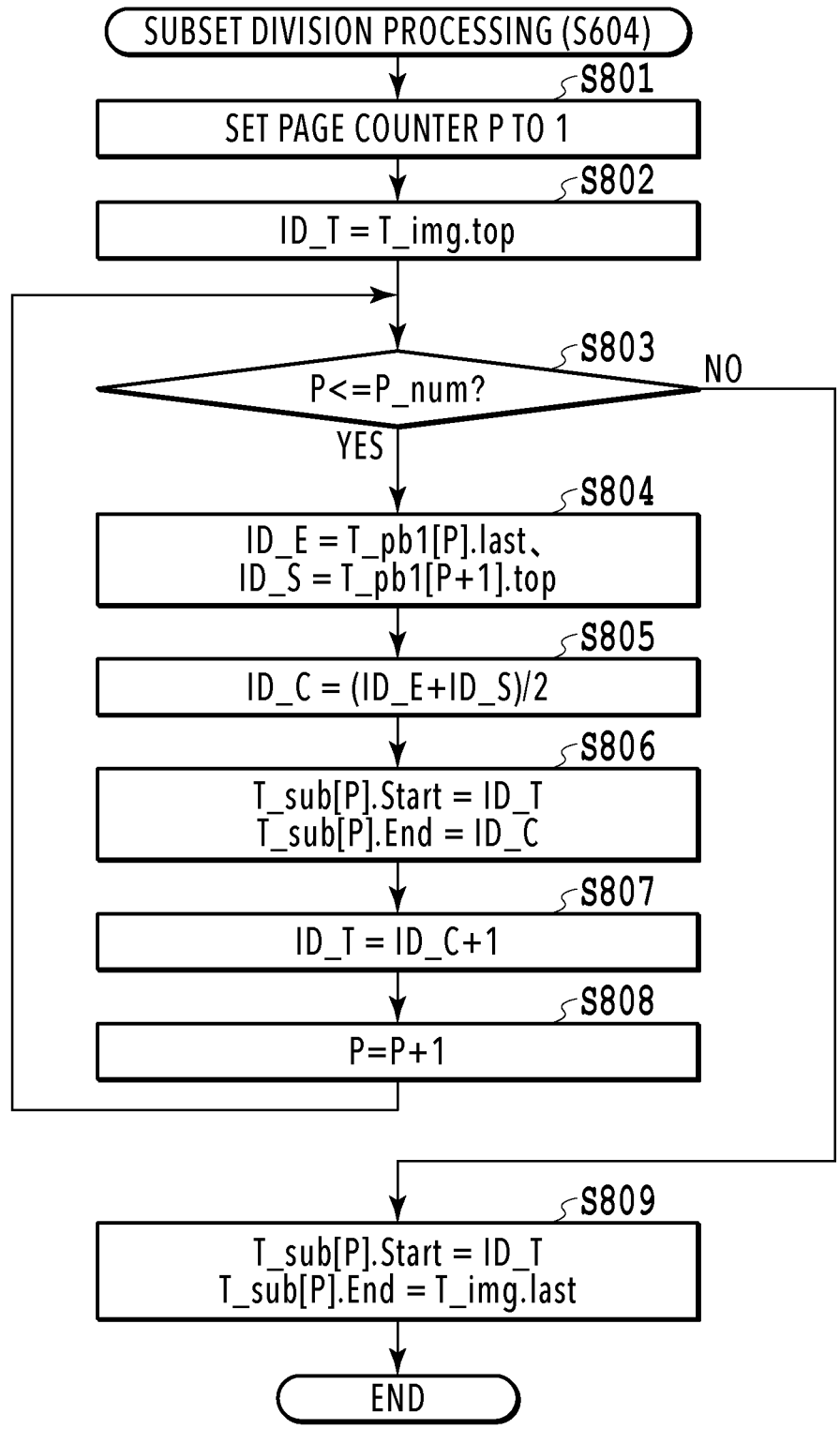
FIG. 8 is a flowchart showing subset division processing.

Next, by using FIG. 8, processing to divide the material image set into subsets (processing at step S604) is explained.

At step S801, the subset division unit 202 initializes a page counter P indicating a processing-target page to 1.

At step S802, the subset division unit 202 acquires the top image ID within T_img, that is, the smallest image ID within T_img as ID_T. In FIG. 8, there is a case when the top image ID and the last image ID within T_img are described as T_img. top and T_img. last, respectively.

At step S803, the subset division unit 202 determines whether P is less than or equal to P_num. In the case when P is less than or equal to P_num (YES at step S803), the processing advances to step S804. On the other hand, in the case when P is greater than P_num (NO at step S803), the processing advances to step S809.

At step S804, the subset division unit 202 acquires the last image ID (largest image ID) in Constituent image ID list of the page whose Page ID is P as ID_E from T_pb1. Similarly, the subset division unit 202 acquires the top image ID (smallest image ID) in Constituent image ID list of the page {P+1} of T_pb1 as ID-S. In FIG. 8, there is a case when Constituent image ID list of the page whose Page ID is P in T_pb1 is described as T_pb1 [P]. Further, there is a case when the top and last image IDs of T_pb1 [P] are described as T_pb1 [P]. top and T_pb1 [P]. last, respectively.

At step S805, the subset division unit 202 acquires the ID located in the middle of ID_E and ID_S acquired at step S804 as ID_C. Specifically, ID_C is acquired by (ID_E+ IE_S)/2, the fractional part being round down.

At step S806, the subset division unit 202 stores ID_T in Start of the row whose Subset ID is P and stores ID_C in End in T_sub. In FIG. 8, there is a case when the subset whose Subset ID is P is described as T_sub [P]. Further, there is a case when Start and End of T_sub [P] are described as T_sub [P]. Start and T_sub [P]. End, respectively.

At step S807, the subset division unit 202 sets the next ID of ID_C as ID_T. That is, ID_T=ID_C+1.

At step S808, the subset division unit 202 increases the value of the page counter P by one.

At step S809, the subset division unit 202 stores ID_T in Start of the row whose Subset ID is P and stores the last image ID within T_img in End in T_sub as at step S806. As described above, the material image set is divided into subsets.

Figure 9:
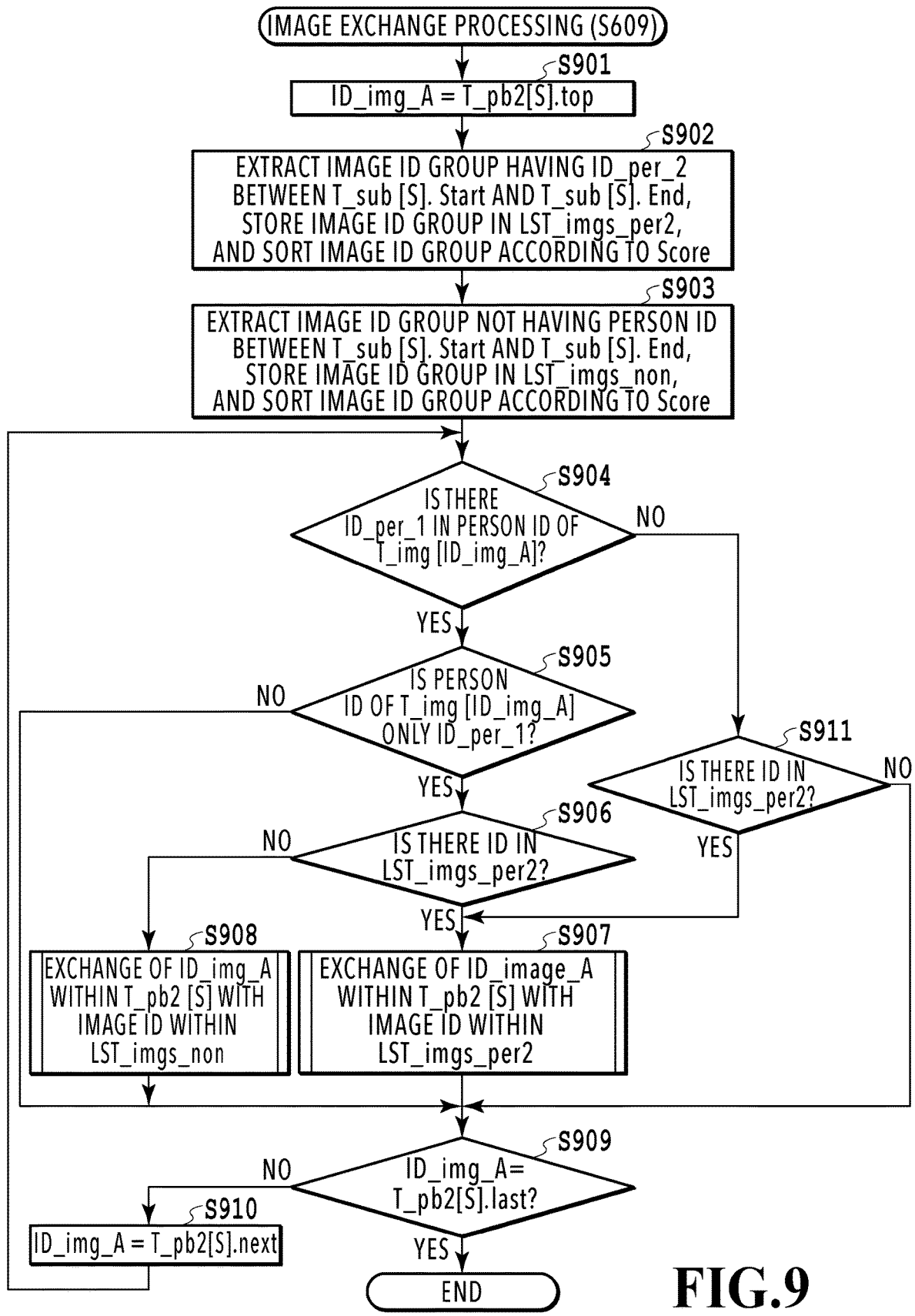
FIG. 9 is a flowchart showing image exchange processing.

Next, by using FIG. 9, the image exchange processing (processing at step S609) that is performed for the processing-target subset S is explained.

At step S901, the image exchange control unit 204 acquires the top image ID from Constituent image ID list of the row whose Page ID is S in T_pb2 and takes the image ID as ID_imag_A.

At step S902, the image exchange control unit 204 refers to T_sub and specifies the image group of the subset S. Then, the image exchange control unit 204 extracts an image that is not included in T_pb1 and whose ID_per_2 is included in Face information list of T_img from the image group of the subset S. The image exchange control unit 204 sorts the image IDs of the extracted images in the order from the image ID whose Score of T_img is the highest and stores the image IDs in a list (hereafter, referred to as LST_imgs_per2).

At step S903, the image exchange control unit 204 extracts an image that is not included in T_pb1 and which does not have Face information list in T_img from the image group of the subset S specified at step S902. The image exchange control unit 204 sorts the image IDs of the extracted images in the order from the image ID whose Score in T_img is the highest and stores the image IDs in a list (hereafter, referred to as LST_imgs_non).

At step S904, the image exchange control unit 204 determines whether the face information whose person ID is ID_per_1 is included in Face information list of the image whose Image ID is ID_img_A. In the case when the face information is included (YES at step S904), the processing advances to step S911. On the other hand, in the case when the face information is not included (NO at step S904), the processing advances to step S911.

At step S905, the image exchange control unit 204 determines whether the person ID included in Face information list of the image whose Image ID is ID_img_A is only ID_per_1. In the case when only ID_per_1 is included (YES at step S905), the processing advances to step S906. On the other hand, in the case when a plurality of person IDs is included (NO at step S905), the processing advances to step S909.

At step S906, the image exchange control unit 204 determines whether an image ID is included in LST_imgs_per2, that is, whether LST_imgs_per2 is not empty. In the case when LST_imgs_per2 is not empty (YES at step S906), the processing advances to step S907. On the other hand, in the case when LST_imgs_per2 is empty (NO at step S906), the processing advances to step S908.

At step S907, the image exchange control unit 204 performs processing to exchange ID_img_A within Constituent image ID list of the row whose Page ID is S with the image ID within LST_imgs_per2 in T_pb2. This processing (second person image exchange processing) will be described later by using a flowchart shown in FIG. 10.

Figure 11:
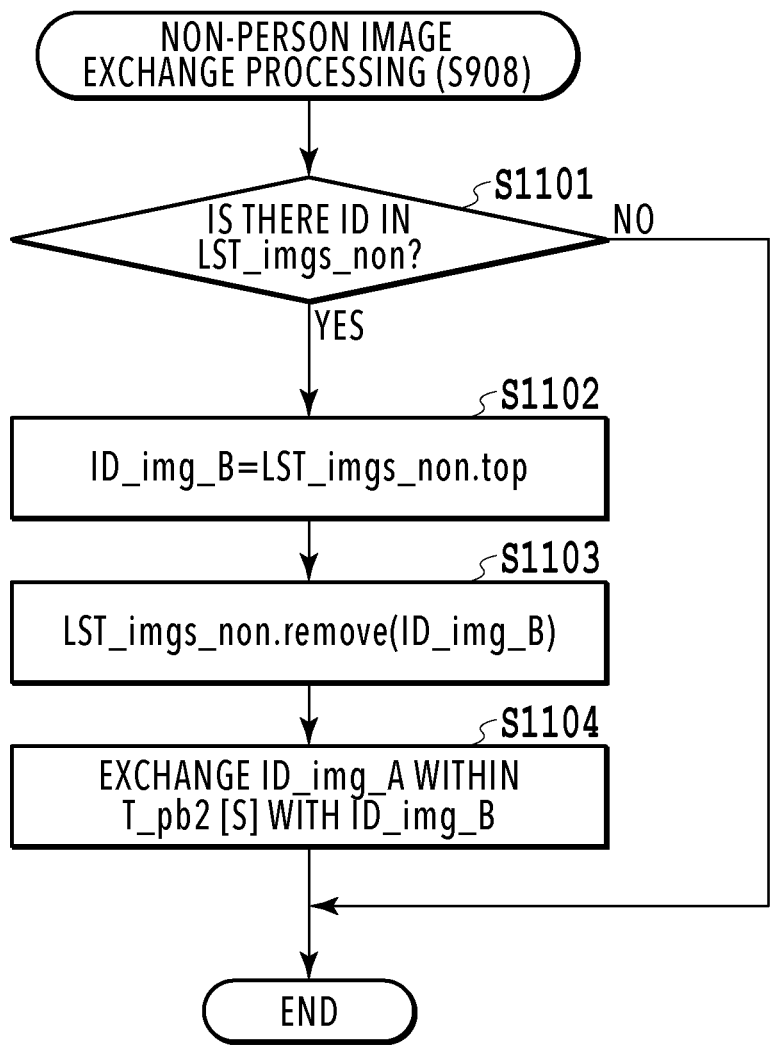
FIG. 11 is a flowchart showing non-person image exchange processing.

At step S908, the image exchange control unit 204 performs processing to exchange ID_img_A within Constituent image ID list of the row whose Page ID is S with the image ID of the image (image not including a person) in which no person is captured in T_pb2. Hereafter, an image in which no person is captured is referred to as a non-person image. This processing (non-person image exchange processing) will be described later by using a flowchart shown in FIG. 11.

At step S909, the image exchange control unit 204 determines whether the processing has been performed for all the image IDs within Constituent image ID list of the row whose Page ID is S in T_pb2. Here, the image exchange control unit 204 determines whether ID_img_A is the last image ID within Constituent image ID list. In the case when the processing has been completed for all the image IDs (YES at step S909), the processing is terminated. On the other hand, in the case when the processing has not been completed for all the image IDs (NO at step S909), the processing advances to step S910.

At step S910, the image exchange control unit 204 substitutes the next ID within Constituent image ID list of T_pb2 for ID_img_A and the processing returns to step S904. In FIG. 9, there is a case when the next row (the next row of the row currently being referred to) of T_pb2 [S] is described as T_pb2 [P]. next.

At step S911, the image exchange control unit 204 determines whether an image ID is included in LST_imgs_per2 as at step S906. In the case when an image ID is included (LST_imgs_per2 is not empty) (YES at step S911), the processing advances to step S907. On the other hand, no image ID is included (LST_imgs_per2 is empty) (NO at step S911), the processing advances to step S909. In this manner, the image exchange processing in the first embodiment is performed.

Next, the second person image exchange processing at step S907 is explained.

At step S1001, the image exchange control unit 204 acquires the top image ID of LST_imgs_per2 and takes the acquired image ID as ID_img_B.

Figure 10:
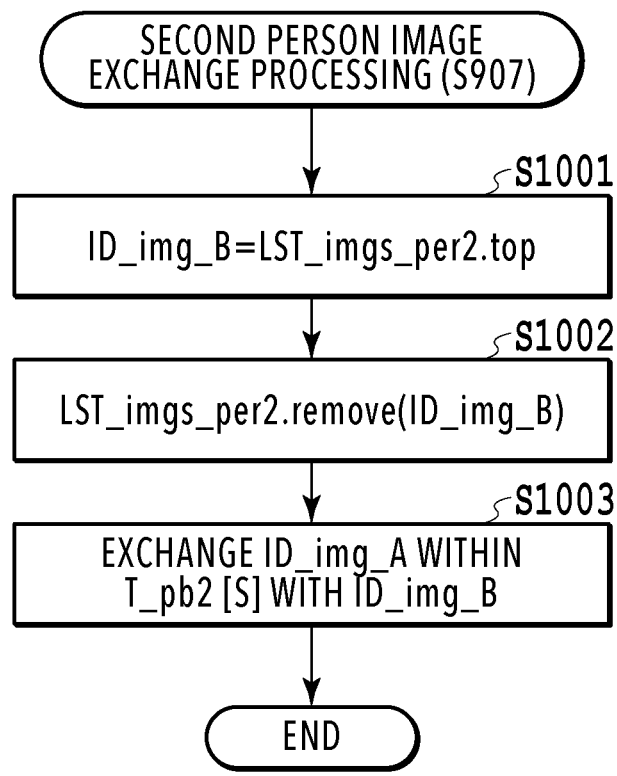
FIG. 10 is a flowchart showing second person image exchange processing.

At step S1002, the image exchange control unit 204 deletes ID_img_B acquired at step S1001 from LST_imgs_per2. LST_imgs_per2. remove (ID_img_B) in FIG. 10 represents a command to delete ID_img_B from LST_imgs_per2.

At step S1003, the image exchange control unit 204 exchanges ID_img_A within Constituent image ID list of the row whose Page ID is S with ID_img_B in T_pb2. In this manner, it is possible to exchange the image in which the first person is captured with the image in which the second person is captured.

Next, the non-person image exchange processing at step S908 is explained.

At step S1101, the image exchange control unit 204 determines whether there is an image ID in LST_imgs_non. In the case when there is an image ID (YES at step S1101), the processing advances to S1102. On the other hand, in the case when there is no image ID (NO at step S1101), the processing is terminated.

At step S1102, the image exchange control unit 204 acquires the top image ID of LST_imgs_non and takes the acquired image ID as ID_img_B.

At step S1103, the image exchange control unit 204 deletes ID_img_B acquired at step S1102 from LST_imgs_non.

At step S1104, the same processing as that at step S1003 in FIG. 10 is performed.

In this manner, it is possible to exchange the image in which the first person is captured with the non-person image.

As explained above, in the present embodiment, the material image set is divided into subsets in units of pages and images are exchanged in units of subsets. More specifically, an image in which the first person is captured is deleted from the page on which the image in which the first person is captured exists and an image in which the second person is captured or a non-person image existing within the subset corresponding to the page is added. Further, on a page where an image in which the first person is captured does not exist, in the case when an image in which the second person is captured exists in the subset corresponding to the page, an image in which the second person is captured is added. Due to this, it is possible to create a photo book whose main character is the second person from the photo book created by taking the first person as the main character. Further, in the present embodiment, based on the image selection information (T_pb1 described above) created once, an image in which the person who is the main character is captured is exchanged but the other images are not exchanged. Due to this, it is possible to leave images in which the person who is the main character is not captured as they are while exchanging an image in which the person who is the main character is captured. Because of this, it is possible to leave images common to those of the photo book before the exchange in the photo book after the image exchange. By recreating the photo book by using the image selection information created in the present embodiment as described above, it is made possible to create a photo book for each main character while leaving the common characteristics that the event in which the first person participated and the event in which the second person participated are the same.

In the present embodiment, an image whose objects are landscapes, dishes, and so on, that is, other than a person, and whose objects are not a person, is handled as a non-person image. However, it may also be possible to handle an image in which a plurality of persons is captured, and, therefore, it is difficult to determine the person who is the main character, as a non-person image. In the flow shown in FIG. 11, the example is shown in which in the case when an image in which no person is captured does not exist within the subset, images are not exchanged. However, in such a case, it may also be possible to take an image in which a plurality of persons is captured as an exchange target.

Further, generally, in the photo book, images are arranged in the order of the time of image capturing. Because of this, in the case when an image in which a person is captured is exchanged simply without taking pages into consideration, the time line collapses and a feeling of incongruity is given. In the present embodiment, an exchange-target image is selected from the subset obtained by dividing the material image set along the time series of the time of image capturing. Because of this, it is possible to create a photo book that does not collapse the time line and that does not give a feeling of incongruity.

Further, in the present embodiment, the case when there is only one person who is the main character is taken as an example, but a plurality of persons may be the main character. For example, a group of a plurality of persons, such as a couple and a family, may be the main character. In this case, in the processing to acquire the person ID (processing at steps S605, S606), a processing target is a group of a plurality of persons and on the screen shown in FIG. 7, an image in which a group of a plurality of persons is captured is displayed. As a method of detecting a group of a plurality of persons, for example, mention is made of a method of determining a group of a plurality of persons from the number of images in which a plurality of specific persons is captured together, a deviation of a distribution of the image capturing time zone of the image in which a plurality of specific persons is captured together, the distances between faces of a plurality of persons within the image, and so on.

Further, in the present embodiment, the example is explained in which images are not exchanged in the case when an exchange-target image does not exist within the subset (NO at step S1101). However, it may also be possible to exchange images by randomly selecting an image within the subset, by a photo book creator selecting an arbitrary image, and so on.

Further, in the present embodiment, the division portion of the subset is taken to be the middle of ID_E and ID_S, but it may also be possible to take a portion between image IDs whose difference in the time of image capturing is large between ID_E and ID_S as the division portion.

Furthermore, as an image arrangement method in a photo book, in addition to a method of arranging images of an event in the order of the time of image capturing, there is also a method of allocating a page for each kind of event. In the case when such an image arrangement method is adopted, it may also be possible to divide the material images into subsets for each kind of event by determining the kind of event. In order to implement such an aspect, for example, it is sufficient to store identification information capable of determining the kind of event in the image management table in association with each image ID. Further, there is a case when a page representing a digest of the entire event in which images whose image capturing time zones are different are collected exists within a photo book. In such a case, it is sufficient to determine a page in which the image capturing time of each image is different from one another and the variance is large to be a digest page by calculating the variance of the image capturing times of images selected on each page. A digest page is not taken to be a target of subset division processing. Further, for a digest page, an exchange-target image is selected from the entire material image set.

Furthermore, in the present embodiment, the example is explained in which an exchange-target image is selected based on Score (in the order from highest Score). However, the example is not limited to this and it may also be possible to calculate a degree of similarity between an image already selected in the image selection information and a selection-candidate image and to exclude the selection-candidate image from the exchange target in the case when the degree of similarity is high. The calculation method of the degree of similarity between images may be a publicly known method and, for example, it may also be possible to calculate an average color of an image, to calculate a distance between average colors of two images, and to determine the degree of similarity from the length of the distance.

Further, it is supposed that the photo book management table (T_pb1) of the already-created photo book used as an input in the present embodiment is created manually, but, the photo book management table may be created by a publicly known automatic selection algorithm. Furthermore, it may also be possible to use the photo book management table (T_pb2) of the photo book created in the present embodiment as an input.

Second Embodiment

In the first embodiment, an example is explained in which the processing, to exchange the image in which the first person is captured with the image in which the second person is captured, is controlled for each double-page spread. However, in the case when there are many exchangeable images in which the second person is captured, there is a possibility that the number of images in which the second person is captured after the image exchange becomes greater than the number of images in which the first person is captured before the image exchange. In this case, the number of selected images in which no person is captured, which are selected in common between the photo books before and after the image exchange decreases, and, therefore, the ratio of appearance of the main character changes. Because of this, the degree of similarity between the photo books is reduced, and the common characteristics, that the event in which the first person participated and the event in which the second person participated are the same, are reduced between the photo books. In order to deal with such a problem, in a second embodiment, the number of images in which the first person is captured is acquired, and the number of images to be exchanged is controlled, in accordance with the acquired number of images. In the following, only the portion different from that of the first embodiment is explained and an explanation of the common portions is omitted.

Figure 12:
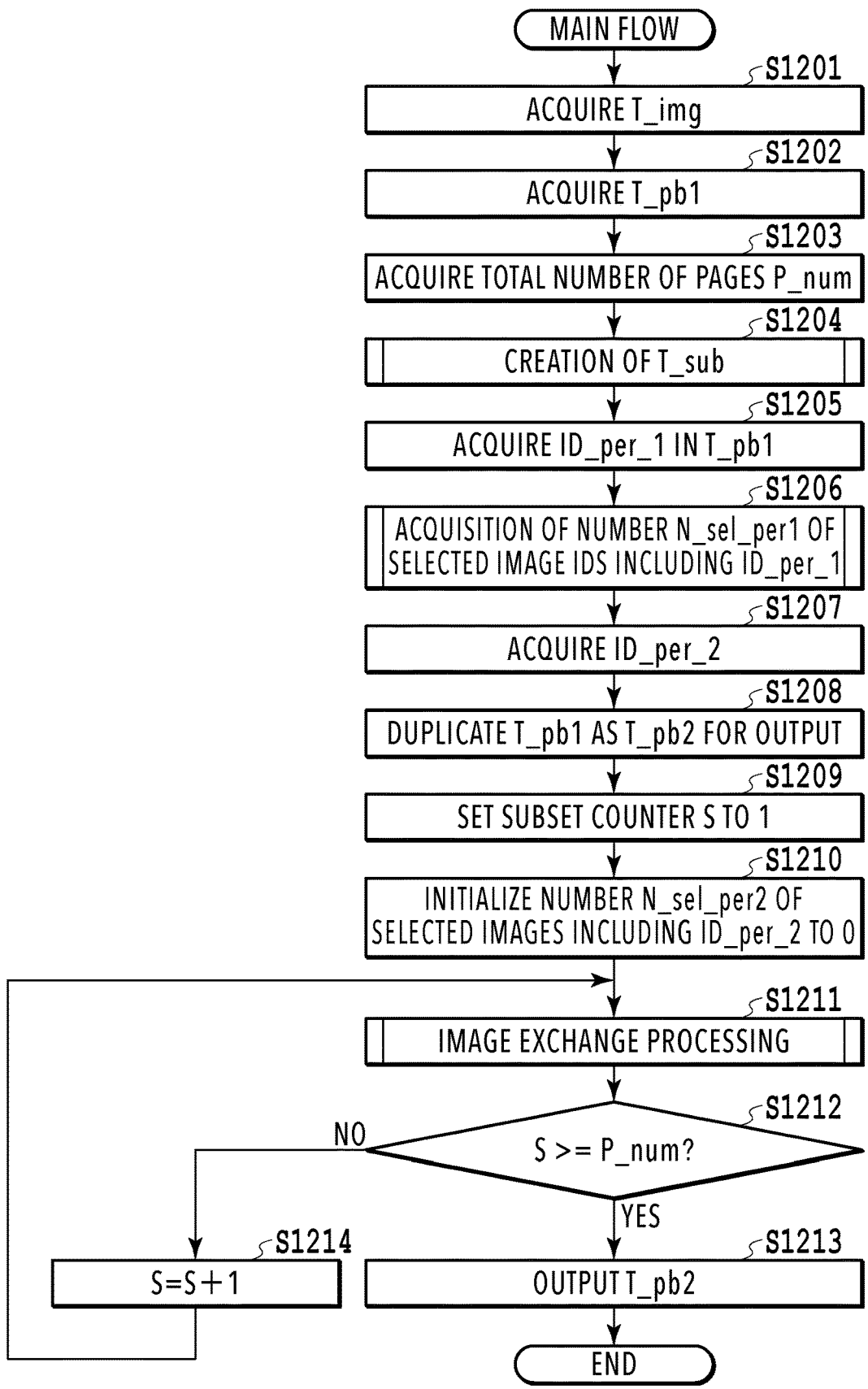
FIG. 12 is a flowchart showing an operation of an information processing apparatus according to a second embodiment.

FIG. 12 is a flowchart showing the operation of an information processing apparatus according to the second embodiment. FIG. 12 shows a main flow of processing to create a photo book management table of a photo book whose main character is the second person by using information on the already-created photo book in the second embodiment. The processing at steps S1201 to S1205, S1207 to S1209, and S1212 to S1214 is the same as the processing at steps S601 to S605, S606 to S608, and S610 to S612, and, therefore, an explanation is omitted.

At step S1206, the image exchange control unit 204 performs processing to acquire the number (hereafter, referred to as N_sel_per1) of images in which the first person is captured (images including ID_per_1), which are selected in T_pb1. This processing (hereafter, referred to as first person image number acquisition processing) will be described later by using FIG. 13.

At step S1210, the image exchange control unit 204 initializes a variable N_sel_per2 indicating the number of images (images including ID_per_2) in which the second person is captured, which are selected in T_pb2, to 0.

Image exchange processing at step S1211 is the same as the image exchange processing at step S609 in FIG. 9. However, control based on N_sel_per1 and N_sel_per2 is performed. Details of the image exchange processing at step S1211 will be described later by using FIG. 14. In the present embodiment, as described above, the image selection information (T_pb2) for creating a photo book whose main character is the second person is generated.

Figure 13:
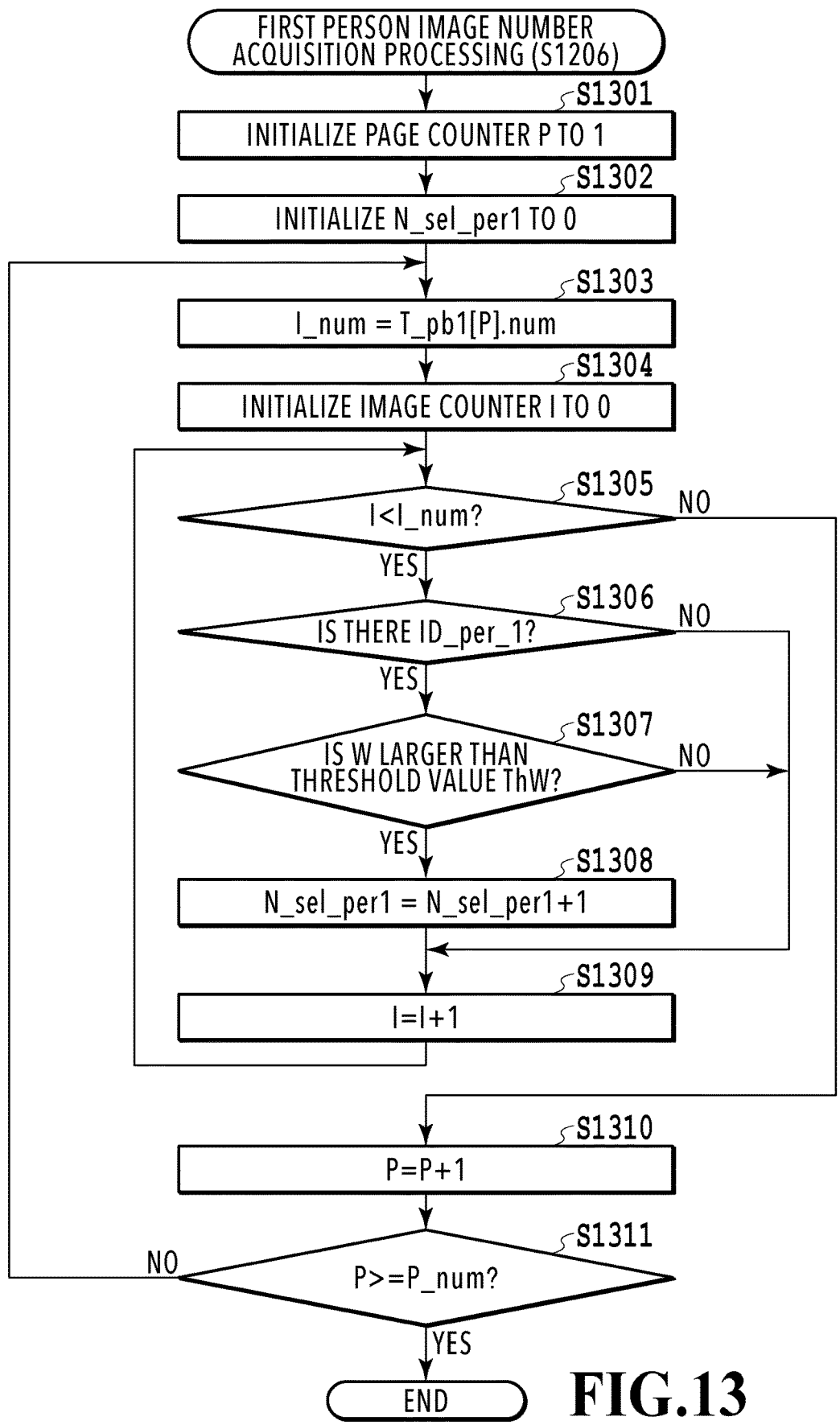
FIG. 13 is a flowchart showing first person image number acquisition processing in the second embodiment.

Next, by using FIG. 13, the first person image number acquisition processing (processing at step S1206) is explained. The processing at step S1301 and S1310 is the same as the processing at steps S801 and S808, and, therefore, an explanation is omitted.

At step S1302, the subset division unit 202 initializes N_sel_per1 to 0.

At step S1303, the subset division unit 202 acquires the number of images included in Constituent image ID list of the page whose Page ID is P from T_pb1 and stores the number as I_num.

At step S1304, the subset division unit 202 initializes an image counter I to 0.

At step S1305, the subset division unit 202 determines whether the image counter I is smaller than I_num. In the case when the image counter I is smaller than I_num (YES at step S1305), the processing advances to step S1306. On the other hand, in the case when the image counter I is larger than or equal to I_num (NO at step S1305), the processing advances to step S1310.

At step S1306, the subset division unit 202 specifies the image having the image ID corresponding to the image counter I from T_img and determines whether ID_per_1 is included in the person ID of Face information list of the specified image. In the case when ID_per_1 is included (YES at step S1306), the processing advances to step S1307. On the other hand, in the case when ID_per_1 is not included (NO at step S1306), the processing advances to step S1309.

At step S1307, the subset division unit 202 acquires the face width W corresponding to ID_per_1 from Face information list of the image specified at step S1306 and determines whether the face width W is larger than a threshold value ThW. In the case when the face width W is larger than the threshold value ThW (YES at step S1307), the processing advances to step S1308. On the other hand, in the case when the face width W is smaller than or equal to the threshold value ThW (NO at step S1307), the processing advances to step S1309. In the case when, for example, the width of an image×0.15 is set to the threshold value ThW, on a condition that the ratio of the width of the face area to the width of the image is larger than 15%, YES is determined at step S1307. Here, only the width W of the face area is used, but the height H of the image area may be used and further, it may also be possible to use the area of the face area obtained by multiplying the width W and the height H.

At step S1308, the subset division unit 202 increases the value of N_sel_per1 by one. At step S1309, the subset division unit 202 increases the value of the image counter I by one.

At step S1311, the subset division unit 202 determines whether the page counter P is greater than or equal to P_num. In the case when the page counter P is larger than or equal to P_num (YES at step S1311), the processing is terminated. On the other hand, in the case when the page counter P is less than P_num (NO at step S1311), the processing returns to step S1303. In this manner, the number N_sel_per1 of images in which the first person is captured, which are selected in T_pb1, is acquired.

Figure 14:
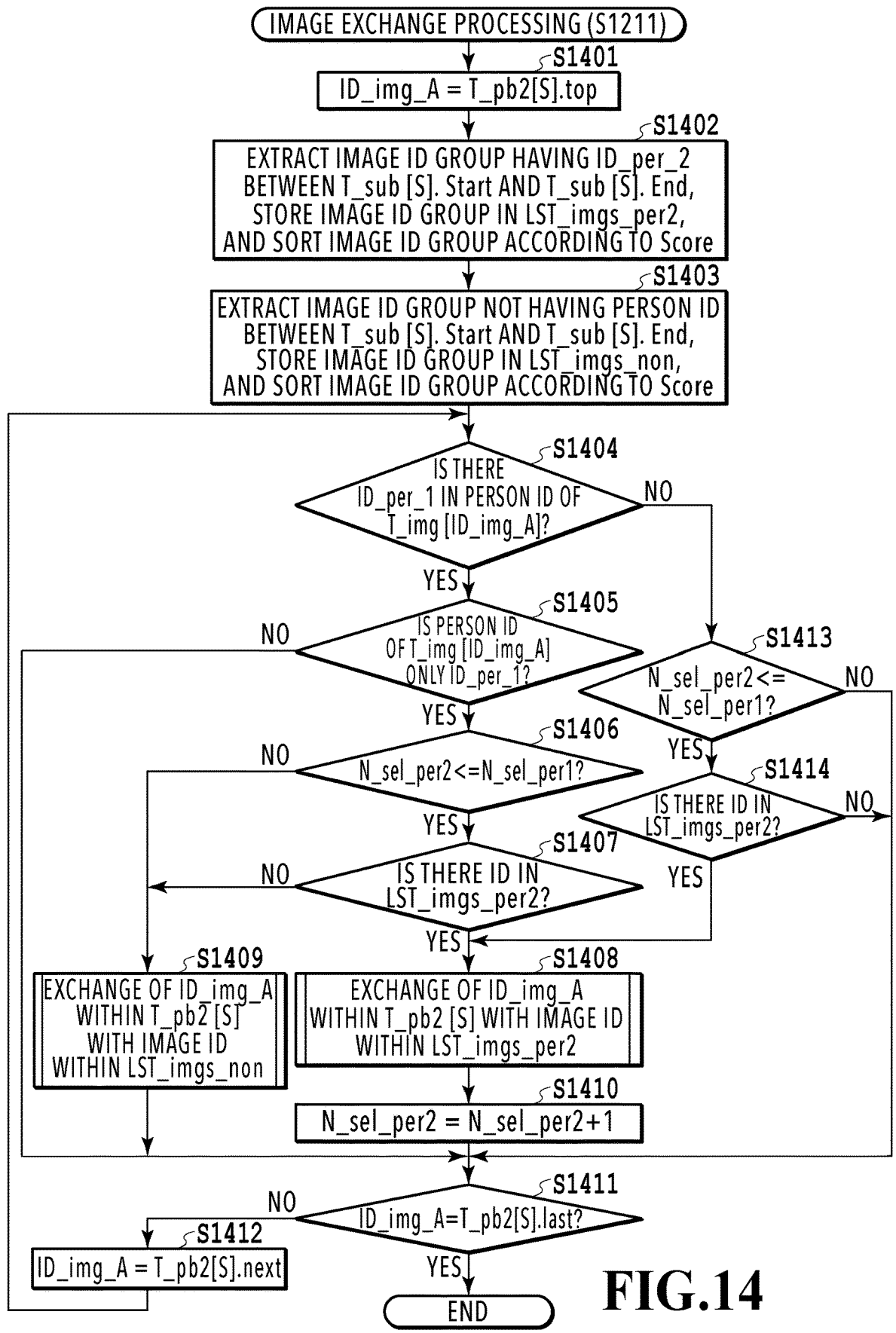
FIG. 14 is a flowchart showing image exchange processing in the second embodiment.

Next, with reference to FIG. 14, the image exchange processing (step S1211) in the second embodiment is explained. The processing at steps S1401 to S1405 and S1407 to S1409 is the same as the processing at steps S901 to S905 and S906 to S908, and, therefore, an explanation is omitted. Further, the processing at steps S1411, S1412, and S1414 is the same as the processing at steps S909, S910, and S911, and, therefore, an explanation is omitted.

In the case when YES is determined at step S1405, the processing advances to step S1406. At step S1406, the image exchange control unit 204 determines whether N_sel_per2 is less than or equal to N_sel_per1. In the case when N_sel_per2 is less than or equal to N_sel_per1 (YES at step S1406), the processing advances to step S1407. On the other hand, in the case when N_sel_per2 is larger than N_sel_per1 (NO at step S1406), the processing advances to step S1409.

In the case when NO is determined at step S1404, the processing advances to step S1413. At step S1413, the image exchange control unit 204 determines whether N_sel_per2 is less than or equal to N_sel_per1 as at step S1406. In the case when N_sel_per2 is less than or equal to N_sel_per1 (YES at step S1413), the processing advances to step S1411. On the other hand, in the case when N_sel_per2 is larger than N_sel_per1 (NO at step S1413), the processing advances to step S1411.

At step S1410, the image exchange control unit 204 increases the value of N_sel_per2 by one. In this manner, the image exchange processing in accordance with the number of images in which the first person is captured is performed.

As explained above, according to the present embodiment, it is possible to make the number of images in which the first person appears the same as the number of images in which the second person appears before and after image exchange. Consequently, the degree of similarity between the photo book before image exchange and the photo book after image exchange is not reduced. Because of this, it is possible to leave the common characteristics that the event in which the first person participated and the event in which the second person participated are the same between both the photo books.

In the present embodiment, control is performed so that the total number of images, in which the person who is the main character is captured, is the same before and after image exchange in the whole of the photo book. However, it may also be possible to perform control so that the number of images in which the person is captured with a page is less than or equal to a threshold value. Due to this, it is made possible to prevent a page, on which only images in which the second person is captured, are selected from being generated. As the threshold value, it may also be possible to calculate the number of selected images in which the first person is captured from T_pb1 for each page and to use the mode thereof.

In the processing at steps S1307 and S1308, based on the magnitude of the width W of the face area, the number of images in which the first person is captured is calculated. The reason is that even in the case of an exchange-target image in which the person is captured, on a condition that the face area within the image is small, the person is not conspicuous and the degree of being as a main character is low. Consequently, in the present embodiment, in the case when the width W of the face area is equal to or less than a threshold value, it is determined that the image is not appropriate as an exchange target.

Further, in the processing at step S1405, whether the degree of being as a main character is high is determined by checking whether the person ID included in an image is only ID_per_1, not in plurality. However, it may also be possible to use whether the magnitude of the width W of the face of the first person included in the image is greater than a threshold value for the determination, not only whether the number of person IDs is one. Further, it may also be possible to use the height H or the area of the face area obtained by multiplying the width W and the height H in place the width W. Furthermore, in the processing at step S1407, it may also be possible to determine whether to perform the processing at step S1408 according to whether the face width W corresponding to ID_per_2 is larger than a threshold value, not only whether there is ID_per_2. Similarly, also in the processing at step S1409 (more specifically, the processing at step S1101), in the case when the face width W is smaller than a threshold value even though the image includes a person ID, it may also be possible to determine that the image is an image in which no person is captured.

Further, it may also be possible to determine whether the degree of being as a main character is high for the person captured in an image by checking whether the position of the face area within the image is located at the area at which the main object is arranged in terms of composition, such as the position in the vicinity of the center of the image and the position in the vicinity of the intersection of the rule of thirds. Furthermore, it may also be possible to acquire the direction toward which (the face of) the person captured in an image faces by a publicly known method and to determine that the degree of being as a main character is high for the person in the case when the face of the person captured in the image faces the front. Conversely, it may also be possible to determine that the degree of being as a main character is low for the person in the case when the face of the person captured in the image faces sideways.

Further, at the time of exchanging an image in which the first person is captured with an image in which the second person is captured or an image in which no person is captured, in the case when the number of exchange-target images is small within the subset, automatic exchange processing is not appropriate. In this case, it may also be possible to recommend a photo book creator to manually create a photo book whose main character is the second person from the beginning.

Third Embodiment

In the first embodiment and the second embodiment, the case is taken to be an example when the number of images arranged per double-page spread is the same, that is, four, and the size of each image arranged on a double-page spread is the same. However, in the case when an image is simply exchanged without changing the layout, there is a possibility that the exchange of persons is not noticed. In order to address this problem, in the present embodiment, an example is explained in which an image of a person who is the main character is arranged large and an image in which no person is captured is arranged small. In the following, differences from the first embodiment are explained.

FIG. 15 is a diagram showing an example of a photo book management table in the third embodiment. In the present embodiment, in place of the photo book management table shown in FIG. 4, a photo book management table shown in FIG. 15 is used. In a photo book management table 1501, information on each slot arranged within a double-page spread is stored in association with Page ID of the double-page spread. The information on a slot includes Slot ID, which is identification information on the slot, Image ID of an image arranged in the slot, and Coordinates of (the image arranged in) the slot. Coordinates of a slot include an X-coordinate (hereafter, described as Ix) and a Y-coordinate (hereafter, described as Iy) of the center of the slot, a width W (hereafter, described as Iw) and a height H (hereafter, described as Ih) of the slot. In Ix and Iw, a value normalized by taking the top left of a double-page spread to be the origin and the width of the double-page spread to be 1 is stored. Similarly, in Iy and Ih, a value normalized by taking the top left of a double-page spread to be the origin and the height of the double-page spread to be 1 is stored. In the following, there is a case when a page whose Page ID is N is represented as page # N. Further, there is a case when a slot whose Slot ID is N is represented as slot # N. There is a case when an image whose Image ID is N is represented as image # N.

Figure 16A:
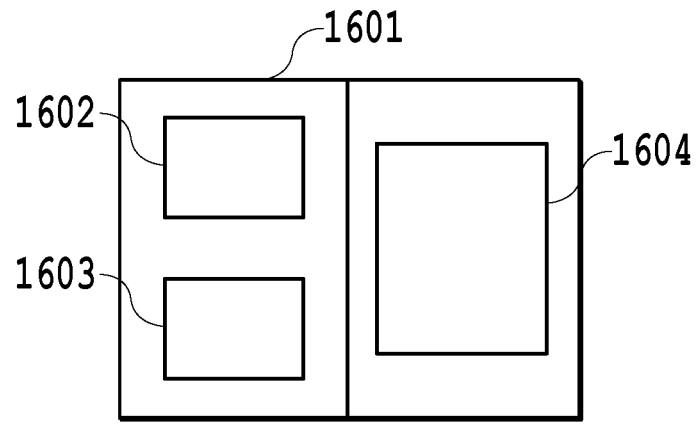
FIG. 16A to FIG. 16C are diagrams each showing an example of a layout of images arranged on a double-page spread.
Figure 16B:
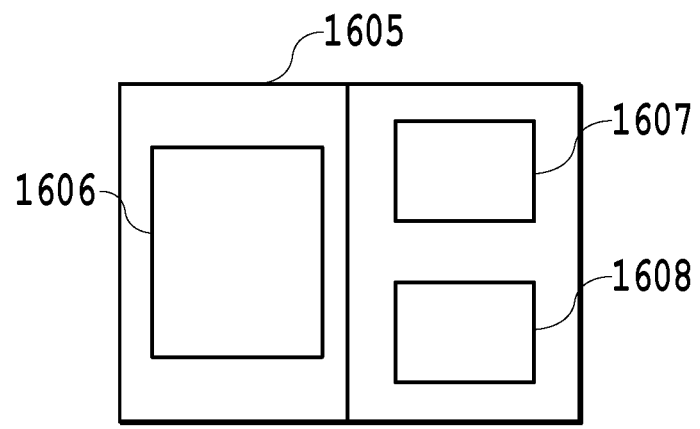
Figure 16C:
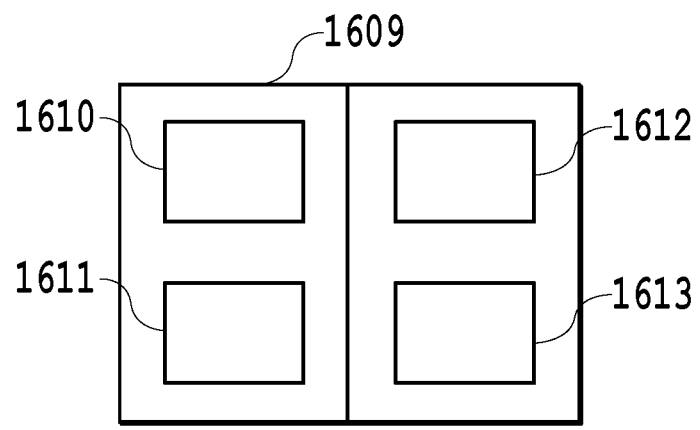

FIG. 16A to FIG. 16C are diagrams each showing an example of a layout of images arranged on a double-page spread. In the present embodiment, it is assumed that slots are arranged on a double-page spread in a layout shown in one of FIG. 16A to FIG. 16C. A double-page spread 1601 shown in FIG. 16A corresponds to page #1 in the photo book management table 1501 shown in FIG. 15. A slot 1602 corresponds to slot #1 in the photo book management table 1501 and in the slot 1602, image #2 is arranged. A slot 1603 corresponds to slot #2 and in the slot 1603, image #6 is arranged. A slot 1604 corresponds to slot #3 and in the slot 1604, image #12 is arranged. On the double-page spread 1601, a slot corresponding to slot #4 does not exist. Consequently, in Image ID and Coordinates corresponding to slot #4 of page #1, "N/A" indicating that there are no corresponding Image ID and Coordinates is stored.

Similarly, a double-page spread 1605 shown in FIG. 16B corresponds to page #2 and a double-page spread 1609 shown in FIG. 16C corresponds to page #8.

In the slot 1604 and a slot 1606 whose size is large, an image in which a person who is the main character is captured is arranged. In the other slots (slots 1602 to 1603, 1607 to 1608, 1610 to 1013), an image in which no person is captured, an image in which a person other than the main character is captured, and so on, are arranged. In the following, for simplification of explanation, it is assumed that only an image in which no person is captured is arranged in the other slots. Consequently, in an already-created photo book taken to be an editing target in the present embodiment, at least two images in which no person is captured are included on each double-page spread.

Further, here, it is supposed that a user views images in the order of the top left, the bottom left, the top right, and the bottom right of a double-page spread. Consequently, in FIG. 16A to FIG. 16C, an example of left binding is shown. In the case when it is supposed that a user views images in an order different from the above-described order, it may also be possible to change the binding method and the order of arrangement accordingly.

Figure 17:
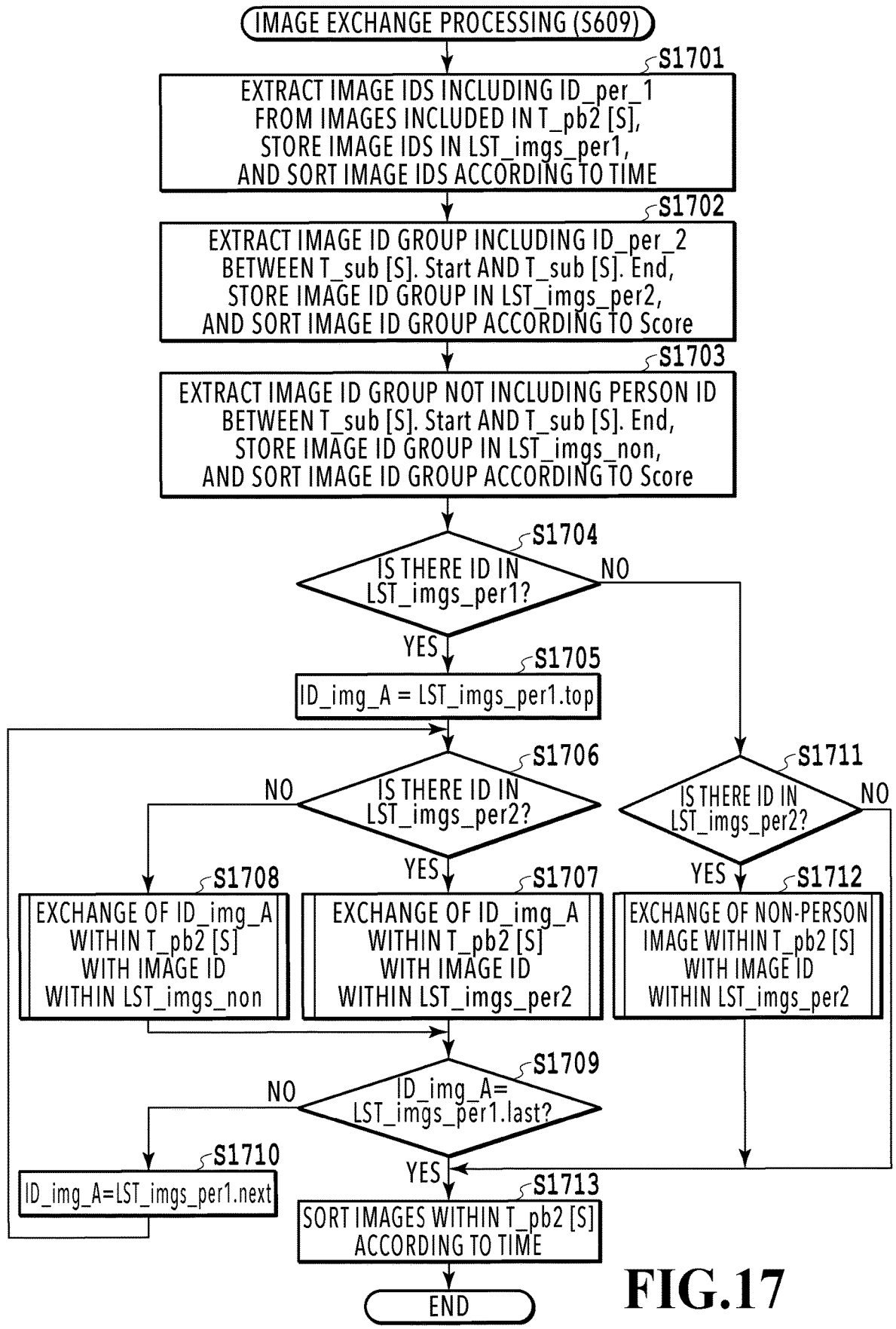
FIG. 17 is a flowchart showing image exchange processing in the third embodiment.

Next, by using FIG. 17, image exchange processing in the third embodiment is explained. FIG. 17 is a flowchart showing image exchange processing in the third embodiment. At step S609 in the present embodiment, in place of the image exchange processing shown in FIG. 9, image exchange processing shown in FIG. 17 is performed. The processing at steps S1702, S1703, and S1707 is the same as the processing at steps S902, S903, and S907, and, therefore, an explanation is omitted.

At step S1701, the image exchange control unit 204 refers to T_pb2 and extracts image IDs in which ID_per_1 is included in Face information list of T_img from the image IDs included in the row whose Page ID is S. The image exchange control unit 204 sorts the extracted image IDs in the order of the time of image capturing and stores the image IDs in a list (hereafter, described as LST_imgs_per1).

At step S1704, the image exchange control unit 204 determines whether an image ID is included in LST_imgs_per1, that is, whether LST_imgs_per1 is not empty. In the case when LST_imgs_per1 is empty (YES at step S1704), the processing advances to step S1705. On the other hand, in the case when LST_imgs_per1 is not empty (NO at step S1704), the processing advances to step S1711.

At step S1705, the image exchange control unit 204 acquires the top image ID from LST_imgs_per1 and takes the acquired image ID as ID_img_A.

At step S1706, the image exchange control unit 204 determines whether there is an image ID in LST_imgs_per2, that is, whether LST_imgs_per2 is not empty. In the case when there is an image ID (YES at step S1706), the processing advances to step S1707. On the other hand, in the case when there is no image ID (NO at step S1706), the processing advances to step S1708.

At step S1708, the image exchange control unit 204 performs processing to exchange ID_img_A located within Constituent image ID list of the row whose Page ID is S in T_pb2 with an image ID located within LST_imgs_non. This processing (second person image exchange processing) will be described later by using a flowchart shown in FIG. 18.

At step S1709, the image exchange control unit 204 determines whether the processing has been performed for all the image IDs included in LST_imgs_per1. In the case when the processing has been completed for all the image IDs (YES at step S1709), the processing advances to step S1713. On the other hand, in the case when the processing has not been completed for all the image IDs (NO at step S1709), the processing advances to step S1710.

At step S1710, the image exchange control unit 204 substitutes the next image ID within LST_imgs_per1 for ID_img_A.

At step S1711, the image exchange control unit 204 determines whether there is an image ID in LST_imgs_per2 as at step S1706. In the case when an image ID is included (YES at step S1711), the processing advances to step S1712. On the other hand, in the case when no image ID is included (LST_imgs_per2 is empty) (NO at step S1711), the processing advances to step S1713.

At step S1712, the image exchange control unit 204 performs processing to exchange an image ID having no Face information list within Constituent image ID list of the row whose Page ID is S in T_pb2 with an image ID included in LST_imgs_per2. This processing (non-person image exchange processing) will be described later by using a flowchart shown in FIG. 19.

At step S1713, the image exchange control unit 204 sorts image IDs within Constituent image ID list of the row whose Page ID is S in T_pb2 in the order of the time of image capturing. By the above flow, the image exchange processing in the third embodiment is performed.

Figure 18:
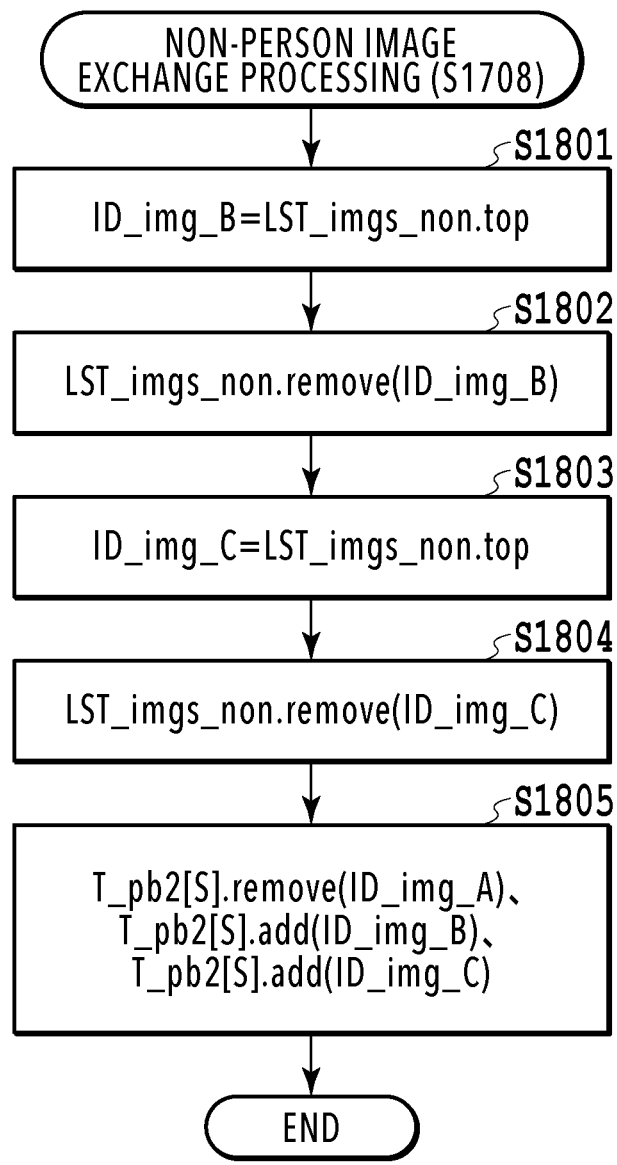
FIG. 18 is a flowchart showing non-person image exchange processing in the third embodiment.

Next, by using FIG. 18, the non-person image exchange processing in the third embodiment is explained. The processing at steps S1801 and S1802 is the same as the processing at step S1102 and S1103, and, therefore, an explanation is omitted. Further, as described above, it is premised that at least two images in which no person is captured are included on a double-page spread, and, therefore, the processing (processing to determine whether LST_imgs_non is empty) corresponding to step S1101 is omitted in the flow shown in FIG. 18.

At step S1803, as at step S1801, the image exchange control unit 204 acquires the top image ID of LST_imgs_non and takes the acquired image ID as ID_img_C.

At step S1804, as at step S1802, the image exchange control unit 204 deletes ID_img_C acquired at step S1803 from LST_imgs_non.

At step S1805, the image exchange control unit 204 deletes ID_img_A from Constituent image ID list of the row whose Page ID is S in T_pb2 and adds ID_img_B and ID_img_C to Constituent image ID list. At this time, the number of images on one side of a double-page spread on which the image of ID_img_A was arranged increases by one. Because of this, in the present embodiment, the display areas corresponding to ID_img_B and ID_img_C are set to be small so that images corresponding to ID_img_B and ID_img_C are included within one side of a double-page spread. By the processing as above, it is possible to change the layout of a double-page spread from the state shown in FIG. 16A or FIG. 16B to the state shown in FIG. 16C.

Figure 19:
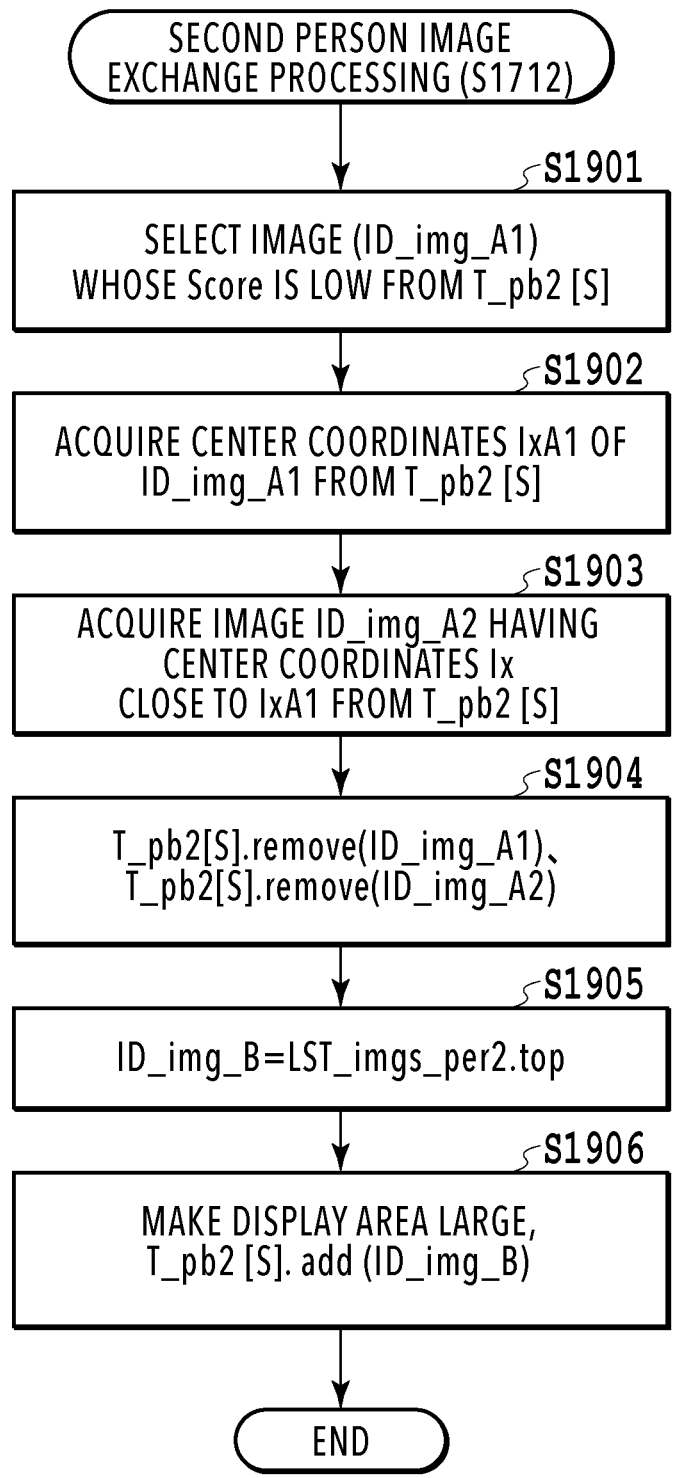
FIG. 19 is a flowchart showing an operation to remove an image in which no person is captured and to select an image in which a second person is captured in the third embodiment.

Next, by using FIG. 19, the processing (processing at step S1708) to exchange an image having no face information with an image having ID_per_2 is explained.

At step S1901, the image exchange control unit 204 selects an image whose Score is low in Constituent image ID list of the row whose Page ID is S of T_pb2 and takes the image ID of the selected image as ID_img_A1. Here, an image whose Score is low is the image whose Score is the lowest of the images within Constituent image ID list. In the case when a plurality of images whose Score is the lowest exists, it is sufficient to select one of them.

At step S1902, the image exchange control unit 204 acquires the X-coordinate Ix of the center of ID_img_A1 from T_pb2 and takes the X-coordinate Ix as IxA1.

At step S1903, the image exchange control unit 204 acquires the image whose center coordinate Ix is the closest to IxA1 of the images of the row whose Page ID is S in T_pb2 and takes the image as ID_img_A2. The image whose center coordinate Ix is the closest to IxA1 is the image arranged within the same one side of the double-page spread as that of the image whose image ID is ID_img_A1. For example, in the case when an image having ID_img_A1 is arranged in the slot 1611 on the double-page spread 1609 shown FIG. 16C, the image ID of the image arranged in the slot 1610 is set to ID_img_A2.

At step S1904, the image exchange control unit 204 deletes ID_img_A1 and ID_img_A2 from the row whose Page ID is S in T_pb2.

At step S1905, the image exchange control unit 204 acquires the top image ID of LST_imgs_per2 and takes the image ID as ID_img_B.

At step S1906, the image exchange control unit 204 adds ID_img_B to the row whose Page ID is S in T_pb2. At the same time, the image exchange control unit 204 selects the kind of layout in which the display area of the image of ID_img_B becomes large and stores coordinates in accordance with the selected layout in the coordinate information of ID_img_B. In the case when there is a plurality of kinds of layout that can be selected, it is sufficient to select the kind of layout according to in which area of the double-page spread the exchange-target image of ID_img_B is arranged in the case when images are arranged in the order of the time of image capturing within the double-page spread.

For example, in FIG. 16C, in the case when Score of the image arranged in the slot 1613 is the lowest, the image ID of the image is acquired as ID_img_A1 and the image ID of the image arranged in the slot 1612 is acquired as ID_img_A2. Further, at this time, in the case when the time of image capturing of the image of ID_img_B is earlier than the times of image capturing of the images arranged in the slots 1610 and 1611, the layout shown in FIG. 16B is selected. On the contrary, in the case when the time of image capturing of the image of ID_img_B is later than the times of image capturing of the images arranged in the slots 1610 and 1611, the layout shown in FIG. 16A is selected. At this time, in the case when the aspect ratio of an image and the aspect ratio of a display area are different, it may also be possible to perform trimming by a publicly known method so that the target person is included within the slot. As described above, it is possible to exchange the layout shown in FIG. 16C with the layout shown in FIG. 16A or FIG. 16B.

As explained above, according to the present embodiment, it is possible to make large the display area of an image in which a person who is the main character is captured and to make small the area of an image in which no person is captured. Due to this, it is possible to create a photo book that emphasizes a person who becomes the main character newly.

Other Embodiments

The embodiments are described in detail above, but it is possible for the present invention to take an embodiment as a system, an apparatus, a method, a program, a storage medium, and so on. Specifically, it may also be possible to apply the present invention to a system including a plurality of pieces of equipment (for example, host computer, interface device, image capturing apparatus, web application, and so on) or to a device including one piece of equipment.

Further, embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is possible to easily create layout data whose main character is another person from already-created layout data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
    at least one processor operatively coupled to a memory, serving as:
    (a) an acquisition unit configured to acquire layout data in which one or more images are arranged on each page of a photo book from an image group;
    (b) a division unit configured to divide the image group into a plurality of subsets based on a number of pages of the photo book; and
    (c) an image exchange unit configured to exchange an image arranged within the layout data, wherein the image exchange unit:
        (i) exchanges a first image that is arranged within a page corresponding to a first subset and in which the first person is included with a second image in which a second person different from the first person is included, in a case when the second image is included within the first subset; and
        (ii) exchanges the first image with a third image in which no person is included, in a case when the second image is not included within the first subset and the third image is included within the first subset.

2. The information processing apparatus according to claim 1, wherein
    the photo book is a photo book in which images are arranged on each page in order of time of image capturing, and
    the division unit generates the subset corresponding to each of the pages by dividing the image group along a time series of time of image capturing so that images arranged on one page are included in the subset corresponding to the one page of the photo book.

3. The information processing apparatus according to claim 1, wherein the image exchange unit sets a size of an area in which the third image is arranged to be smaller than a size of an area in which the first image is arranged at the time of exchanging the first image is included with the third image.

4. The information processing apparatus according to claim 1, wherein the image exchange unit exchanges the third image of the images arranged on each of the pages with the second image.

5. The information processing apparatus according to claim 4, wherein the image exchange unit sets a size of an area in which the second image is arranged to be larger than a size of an area in which the third image is arranged at the time of exchanging the third image is included with the second image.

6. The information processing apparatus according to claim 4, wherein the image exchange unit does not exchange an image in a case when a number of the second images of the images arranged within the layout data exceeds a predetermined threshold value at the time of exchanging the first image or the third image of the images arranged on each of the pages with the second image.

7. The information processing apparatus according to claim 6, wherein the predetermined threshold value is a number of the first images of the images arranged within the layout data before image exchange is performed.

8. The information processing apparatus according to claim 1, further comprising a determination unit configured to specify a person included in images whose number is the greatest from the images arranged within the layout data and to determine the specified person to be the first person.

9. The information processing apparatus according to claim 8, wherein the determination unit determines a person included in images whose number is the greatest second to that of the first person from the images arranged within the layout data and to determine the specified person to be the second person.

10. The information processing apparatus according to claim 1, further comprising:
    a display control unit configured to perform control to display a person specification screen for specifying the first person or the second person on a display device; and
    a determination unit configured to determine a person specified by a user via the person specification screen to be the first person or the second person,
    wherein the display control unit extracts, in a case when the user is caused to specify the first person, a person included in the image arranged within the layout data and displays the extracted person on the person specification screen.

11. The information processing apparatus according to claim 10, wherein the display control unit extracts, in a case when the user is caused to specify the second person, a person included in one of the image group and displays the extracted person on the person specification screen.

12. A control method comprising:
    an acquisition step of acquiring layout data in which one or more images are arranged on each page of a photo book from an image group;
    a division step of dividing the image group into a plurality of subsets based on a number of pages of the photo book; and
    an image exchange step of exchanging an image arranged within the layout data, wherein, in the image exchange step:
        (i) a first image that is arranged within a page corresponding to a first subset and in which the first person is included is exchanged with a second image in which a second person different from the first person is included, in a case when the second image is included within the first subset; and
        (ii) the first image is exchanged with a third image in which no person is included, in a case when the second image is not included within the first subset and the third image is included within the first subset.

13. The control method according to claim 12, wherein the photo book is a photo book in which images are arranged on each page in order of time of image capturing, and,
    in the division step, the subset corresponding to each of the pages is generated by dividing the image group along a time series of time of image capturing so that images arranged on one page are included in the subset corresponding to the one page of the photo book.

14. The control method according to claim 12, wherein, in the image exchange step, a size of an area in which the image in which no person is included is arranged is set to be smaller than a size of an area in which the third image is arranged to be smaller than a size of an area in which the first image is arranged at the time of exchanging the first image with the third image.

15. The control method according to claim 12, wherein, in the image exchange step, the first image of the images arranged on each of the pages is exchanged with the second image.

16. The control method according to claim 15, wherein, in the image exchange step, a size of an area in which the second image is arranged is set to be greater than a size of an area in which the third image is arranged at the time of exchanging the third image with the second image.

17. The control method according to claim 15, wherein, in the image exchange step, an image is not exchanged in a case when a number of the second images of the images arranged within the layout data exceeds a predetermined threshold value at the time of exchanging the first image or the third image of the images arranged on each of the pages with the second image.

18. The control method according to claim 17, wherein the predetermined threshold value is a number of the first images of the images arranged within the layout data before image exchange is performed.

19. The control method according to claim 12, further comprising a determination step of specifying a person included in images whose number is the greatest from the images arranged within the layout data and of determining the specified person to be the first person.

20. The control method according to claim 19, wherein, in the determination step, a person included in images whose number is the greatest second to that of the first person is specified from the images arranged within the layout data and the specified person is determined to be the second person.

21. The control method according to claim 12, further comprising:
a display control step of performing control to display a person specification screen for specifying the first person or the second person on a display device; and
a determination step of determining a person specified by a user via the person specification screen to be the first person or the second person,
wherein, in the display control step, in a case when the user is caused to specify the first person, a person included in the image arranged within the layout data is extracted and the extracted person is displayed on the person specification screen.

22. The control method according to claim 21, wherein in the display control step, in a case when the user is caused to specify the second person, a person included in one of the image group is extracted and the extracted person is displayed on the person specification screen.

23. An information processing apparatus comprising:
at least one processor operatively coupled to a memory, serving as:
(a) an acquisition unit configured to acquire layout data in which one or more images are arranged on each page of a photo book data from an image group;
(b) a division unit configured to divide the image group into a plurality of subsets based on a number of pages of the photobook; and
(c) an image exchange unit configured to exchange an image arranged within the layout data, wherein the image exchange unit:
(i) exchanges a first image that is arranged within a page corresponding to a first subset and in which the first person is included with a second image in which a second person different from the first person is included, in a case when the second image is included within the first subset;
(ii) does not exchange the first image with the second image, in a case when the second image is not included within the first subset, and
(iii) does not exchange the first image with the second image, in a case when the first image also includes a person other than the first person.

24. A control method comprising:
an acquisition step of acquiring layout data, in which one or more images are arranged on each page of a photo book data from an image group;
a division step of dividing the image group into a plurality of subsets based on a number of pages of the photobook; and
an image exchange step of exchanging an image arranged within the layout data, wherein, in the image exchange step:
(i) a first image that is arranged within a page corresponding to a first subset and in which the first person is included is exchanged with a second image in which a second person different from the first person is included, in a case when the second image is included within the first subset;
(ii) the first image is not exchanged with the second image, in a case when the second image is not included within the first subset, and
(iii) the first image is not exchanged with the second image, in a case when the first image also includes a person other than the first person.

25. The control method according to claim 24, wherein the photo book is a photo book in which images are arranged on each page in order of time of image capturing, and, in the division step, the subset corresponding to each of the pages is generated by dividing the image group along a time series of time of image capturing so that images arranged on one page are included in the subset corresponding to the one page of the photo book.

26. The control method according to claim 24, wherein, in the image exchange step, a size of an area in which the third image is arranged is set to be smaller than a size of an area in which the first image is arranged at the time of exchanging the first image with the third image.

27. The control method according to claim 24, wherein, in the image exchange step, the first image of the images arranged on each of the pages is exchanged with the second image.

28. The control method according to claim 27, wherein, in the image exchange step, a size of an area in which the second image is arranged is set to be larger than a size of an area in which the third image is arranged at the time of exchanging the third image with the second image.

29. The control method according to claim 27, wherein, in the image exchange step, an image is not exchanged in a case when a number of the second images of the images arranged within the layout data exceeds a predetermined threshold value at the time of exchanging the first image or the third image of the images arranged on each of the pages with the second image.

30. The control method according to claim 29, wherein the predetermined threshold value is a number of the first images of the images arranged within the layout data before image exchange is performed.

31. The control method according to claim 24, further comprising a determination step of specifying a person included in images whose number is the greatest from the images arranged within the layout data and of determining the specified person to be the first person.

32. The control method according to claim 31, wherein, in the determination step, a person included in images whose number is the greatest second to that of the first person is specified from the images arranged within the layout data and the specified person is determined to be the second person.

33. The control method according to claim 24, further comprising:
- a display control step of performing control to display a person specification screen for specifying the first person or the second person on a display device; and
- a determination step of determining a person specified by a user via the person specification screen to be the first person or the second person,
- wherein, in the display control step, in a case when the user is caused to specify the first person, a person included in the image arranged within the layout data is extracted and the extracted person is displayed on the person specification screen.

* * * * *